US011201937B2

(12) United States Patent
Carley

(10) Patent No.: US 11,201,937 B2
(45) Date of Patent: Dec. 14, 2021

(54) MESSAGE BROKER CUSTOMIZATION WITH USER ADMINISTERED POLICY FUNCTIONS

(71) Applicant: Jeffrey Alan Carley, Colorado Springs, CO (US)

(72) Inventor: Jeffrey Alan Carley, Colorado Springs, CO (US)

(*) Notice: Subject to any disclaimer, the term of this patent is extended or adjusted under 35 U.S.C. 154(b) by 0 days.

(21) Appl. No.: 16/546,221

(22) Filed: Aug. 20, 2019

(65) Prior Publication Data

US 2021/0176326 A1 Jun. 10, 2021

Related U.S. Application Data

(60) Provisional application No. 62/770,813, filed on Nov. 22, 2018.

(51) Int. Cl.
- *H04L 29/08* (2006.01)
- *H04L 12/24* (2006.01)
- *H04L 12/58* (2006.01)

(52) U.S. Cl.
CPC ...... *H04L 67/2809* (2013.01); *H04L 41/0893* (2013.01); *H04L 51/046* (2013.01); *H04L 67/26* (2013.01)

(58) Field of Classification Search
CPC .................................................. H04L 67/2809
See application file for complete search history.

(56) References Cited

U.S. PATENT DOCUMENTS

| | | |
|---|---|---|
| 7,216,181 B1 | 5/2007 | Jannu et al. |
| 7,406,537 B2 | 7/2008 | Cullen |
| 7,414,981 B2 | 8/2008 | Jaramillo et al. |
| 7,530,077 B2 | 5/2009 | Bhogal et al. |
| 8,140,630 B2 | 3/2012 | Jones et al. |
| 8,392,555 B2 | 3/2013 | Gale et al. |
| 8,423,619 B2 | 4/2013 | Hawkins et al. |
| 8,453,163 B2 | 5/2013 | Kothamasu et al. |
| 8,843,580 B2 | 9/2014 | Beardsmore et al. |
| 9,110,884 B2 | 8/2015 | Fang et al. |
| 9,137,189 B2 | 9/2015 | Ross |
| 9,450,895 B2 | 9/2016 | Strassner |
| 9,967,203 B2 | 5/2018 | Walkin et al. |
| 10,135,958 B2 | 11/2018 | Mamas |
| 10,187,278 B2 | 1/2019 | Milyakov et al. |
| 2002/0173984 A1* | 11/2002 | Robertson ............ H04L 67/34 709/220 |
| 2003/0135556 A1 | 7/2003 | Holdsworth |
| 2006/0010195 A1 | 1/2006 | Mamou et al. |

(Continued)

FOREIGN PATENT DOCUMENTS

GB    2354848    4/2001

*Primary Examiner* — Adnan M Mirza
(74) *Attorney, Agent, or Firm* — John Rizvi; John Rizvi, P.A.—The Patent Professor

(57) ABSTRACT

A message broker customization system and method with user administered policy functions. The system uses user defined and controlled policy functions to programmatically, customize the behaviors of a message broker's processing of messages and further allowing for that customization to take place on a per channel basis. This provides for greater functionality and flexibility to the users of a message system, especially when the users of the message system do not have administrative control over the message broker.

20 Claims, 9 Drawing Sheets

(56) References Cited

U.S. PATENT DOCUMENTS

2007/0245018 A1 10/2007 Bhola et al.
2012/0215856 A1* 8/2012 Beardsmore ............ H04L 51/26
                                                                709/206
2017/0244657 A1 8/2017 Baldwin et al.

* cited by examiner

MESSAGE BROKER CUSTOMIZATION WITH USER ADMINISTERED POLICY FUNCTIONS

CROSS-REFERENCE TO RELATED APPLICATION

This application claims the benefit of U.S. Provisional Patent Application Ser. No. 62/770,813, filed Nov. 22, 2018, which is incorporated herein in its entirety.

FIELD OF THE INVENTION

The present disclosure relates generally to computing systems, and more particularly message broker systems and methods.

BACKGROUND OF THE INVENTION

Messaging systems enable information, packaged as messages, to flow between different applications or systems. In a sample messaging system, messages are exchanged between three different types of participants: message producers, message brokers, and message consumers. There are also two different messaging patterns, or messaging domains, that are common among messaging systems; point-to-point, and publish/subscribe. A message producer creates a connection to a message broker, establishes a session with a channel, also known as a destination, on the message broker, and places the message in the channel. A channel may be called a Queue for the point-to-point messaging pattern and a Topic for the publish/subscribe messaging pattern. A message consumer creates a connection to the message broker, establishes a session with a channel on the message broker, and either pulls messages from a Queue or subscribes to a Topic. When a message consumer is subscribed to a Topic the message broker pushes messages placed in the Topic to the message consumer.

Messaging systems have been around for decades. For instance, IBM launched their MQSeries message-oriented middleware products that support messaging back in 1993. Today, there are a wide variety of proprietary and open source based messaging systems in the marketplace. Many of the available products have implemented the Java Messaging Services APIs as well as other standard or proprietary APIs. Some of the available products include Amazon Simple Queue Service (SQS), Amazon Simple Notification Service (SNS), Google Cloud Platform Cloud Pub/Sub, Apache ActiveMQ, IBM MQ (formerly MQSeries, then WebSphere MQ), JBoss Messaging and HornetQ from JBoss (now donated to Apache ActiveMQ), JORAM from the OW2 Consortium, Open Message Queue from Oracle, OpenJMS from the OpenJMS Group, Oracle WebLogic Server and Oracle AQ, and RabbitMQ from Pivotal Software.

Entities and Authorization

The group of hardware, software, and associated humans that interact with a system or program product can be referred to as accessing entities or just entities of the system or program product. There is a group of entities that make use of the messaging system services that are user entities of the messaging system. There are also a group of entities that make use of a message broker component of a messaging system that are user entities of the message broker and this group includes the message producer and message consumer components of the messaging system. A role defines a set of permissions for making service requests to the message broker. When an entity, such as a human user acting through some type of software or hardware interface or a component of a software application, interacts with a message broker they can be considered to be assuming a particular role, and its associated permissions, in regard to their interactions with the message broker. Some exemplary roles that might exist for an entity interacting with a message broker would be: a message broker developer responsible for developing and maintaining the software for the message broker and requiring access to a development and test environment; a message broker implementor responsible for implementing and updating an operational message broker on the underlying supporting systems and requiring some degree of access to the underlying systems and administrative access to the operational message broker; a message broker administrator responsible for maintaining an operational message broker and its associated change management; and a message broker user entity which makes use of the message broker services.

A message broker may provide more than one sub-role for user entities. For instance, some message brokers may provide a user role that allows for the creation, deletion, and configuration of certain parameters, of Queues or Topics. Another role might only allow for the publishing of a message to an existing collection of Queues or Topics and yet another role might only allow for subscribing to one or more existing Topics or pulling messages from one or more existing Queues. Often, the user entity of the message broker is an application program operating in various sub-roles. An application administrative aspect of an application program might operate in a message broker user entity role that creates, deletes, and configures Queues or Topics while other aspects of the application program operate in roles that enqueue and dequeue messages from existing Queues or Topics.

In operational message brokers it is important to only provide authorization for entities to perform the activities that are necessary for the role in which they are functioning. As well, the degree of trust may vary depending upon the role. An organization may want to limit what entities can function in particular roles. They may not be willing to allow broad access to the message broker administrative category of roles and authorization. There may be small teams of individuals that are trusted and authorized to assume the roles associated with development, implementation, and administration of the message broker, but the entities that make use of the message broker services are not trusted with the privileges of a message broker developer, implementor, or administrator. Limiting privileges to the minimum necessary for a particular role is a vital security measure. This becomes even more critical when the message broker is offered as a public service to multiple customers.

Customization of Message Broker Behaviors

A message broker typically has numerous possible behaviors when it receives a message. Examples of some of the behaviors that can result from a message broker receiving a message include storing the message until it can be delivered, routing the message to one or more consumers, transforming the format of the message for the message consumers, filtering the consumers that can/should receive the message, decomposing the message into multiple sub-messages, aggregating the message with other messages, or adding content to the message. When an entity is going to make use of a message broker there often exists the necessity to customize the message broker behaviors and the message flow to the requirements for the entity or application.

Most existing message brokers allow for some limited customization of broker behaviors and message flow. However, they tend to suffer from one or more shortcomings such as the customization of the message flow or behaviors not being dynamic but being fixed at the time of development or implementation (rather than being able to be modified on the fly), the customization impacting the behaviors or message flow for all users of the message broker (rather than having a finer granularity of resources impacted, such as user entities, applications, or channels), or customization of the message broker requiring an elevated level of authorization to the message broker such as that which is typical for a message broker administrator, implementor, or developer role but should not be provided to message broker user entities. For example, a message broker might be customized to call a logging procedure every time a message is received or requiring a message producer or message consumer to authenticate with an authentication system before establishing a session with the message broker. The customized behavior is static in that it is called every time a message is received for all messages or every time a session is established and the behavior won't change without some action being taken by an entity with elevated authorization to the message broker.

In other words, existing message brokers do allow a way of modifying the message broker behavior through both varying the values of one or more arguments for one or more of the functions that control the behavior of the message broker (e.g. configuration parameters when the message broker starts be they from a configuration file or from command line arguments, configuration parameters or environmental variables changed by an administrator for the message broker while the message broker is running, and values passed in by a message broker user entity such as a publisher or subscriber where those values affect the behavior for one or more messages) and through modification of the actual functions that control the message broker behaviors (e.g. custom plugins, method overriding, and custom message broker).

While there are some purposes for using a message broker where simply varying the arguments passed to the functions that control the message broker behavior is sufficient, there are purposes where the greater flexibility of being able to actually specify or modify the code that controls the message broker behavior is advantageous.

The most common ways of customizing a message broker include configuration parameters, plug-ins, and method overriding. These options for customization are controlled by an entity operating in a message broker developer, implementer, or administrator role and impact the behavior of the message broker for all users of the messaging system.

Configuration parameters allow a message broker administrator to establish some of the message broker's behaviors at the time the message broker administrator starts the message broker and offers limited options as to what can be changed or determined by the programming coded by the message broker developer. It's also possible for a message broker developer to allow a user entity to make limited configuration changes to channels to which they've been granted some "administrative" privileges. Again, what can be modified via configuration is determined by the programming by the message system developer.

Plug-ins for a message broker program product are programs written for a particular message broker package that gets called by hooks built into the message broker code that allow for customization of the processing at the points in the message broker where the hooks exist. These plug-ins usually need to be set up at development or implementation time or are controlled by a Message Broker Administrator. Plug-ins will also typically run in the same execution environment (those components that are used together with the application's code to make the complete system: the processors, networks, operating systems and so on) as the message broker and are part of the same administrative domain (a network of computers or a collection of networks and databases, which fall under a single common administration).

Method overriding is often used with application frameworks. A framework is provided for a message broker, such as Apache ActiveMQ, that defines the structure and flow for the message broker and then the implementor can customize the message broker by writing and including child classes that override the method definitions in the parent classes that are a part of the framework distribution. Frameworks are generally dependent on Object Oriented programming methods. This allows the programmer of the child class to modify select behaviors of the message broker without directly modifying the code in the message broker framework objects. This is done before the code is compiled or the executable is built as appropriate for the language.

An additional option is to modify the package code directly, if open source, or to write a custom message broker thus developing a new version of a message broker. Writing custom message brokers requires extensive resources for development, implementation, and administration of the message broker, results in customization for a particular application and is generally not efficient or quick.

Sources of Information Impacting Message Flow and Content

When a message broker is processing a message, it has access to the information in the message headers, possibly the information in the message body (but not always such as when the format or syntax of the message is not known to the message broker or the message body is encrypted), or state and configuration information the message broker may be maintaining (such as configuration parameters for a Queue or Topic or subscriptions to a Topic). The state and configuration data maintained by a message broker is very limited in scope. When a message broker is customized by a plug-in or method overriding the customizing code may access resources not generally available to the message broker, but these plug-ins tend to impact all messages and usually must be set up by an entity with elevated privileges.

Control of Customization Code

Many of the above methods for message broker customization require the execution of the customized code to execute under the same execution environment as the message broker and/or within the same administrative domain. While this might be fine for some deployments of a message broker, there are many deployments where this can be problematic. Typically this can be problematic when there is a trust boundary between the group managing the message broker and the group wanting to customize the message broker behavior and the later group wants to maintain control of the customizing plug-in. This is especially problematic if the customization code needs access to information the customizing group doesn't want made available to the group managing the message broker (such as encryption keys).

Who can Customize the Message Broker

As noted above these options all require involvement of the message broker development and/or implementation teams and/or an administrator for the message broker and the modifications they implement impact all user entities of the message broker. They do not allow modification of the message broker behavior to be initiated or controlled by user entities of the message broker or for finer grained scope of the modifications such as modifying the behavior for a specific channel. If the message broker is dedicated for the use of a single application and the same team administers both the application and the message broker (they are in the same administrative domain) this might be manageable. However, when the message broker is providing messaging services to multiple applications, and application administration and message broker administration are not provided by the same team or possibly aren't even in the same administrative domain, the difficulties of managing the customization of the message broker to meet the requirements of the applications increase. When the message broker is offered as a service to multiple tenants, such as with Amazon Web Service's Simple Queue Service (SQS) or Simple Notification Service (SNS) or with Google Cloud Pub/Sub, allowing extensive modification for individual user entities isn't practical.

Message Filtering

Some message brokers do allow user entities to specify filter information to associate with a subscription to a Topic that the message broker uses to select which messages to forward to a message consumer and which messages not to forward to a message consumer. This might be configurable over the session the message consumer establishes with the message broker or via an administrative interface for the Topic. However, this message filtering is of very limited functionality through the selection of filtering parameters and the filtering takes place in the execution environment of the message broker. The programming of the filtering is established by the message broker provider (developer, implementor, administrator) with a limited set of parameters for the filtering exposed to and configurable by user entities. It doesn't provide a flexible user entity programmatic means of filtering messages.

In summary, following is a list of shortcomings in the prior art:

Static Customization: The code that controls the message broker's behavior is static as in it cannot be changed at run time. The plugins, method overrides, or custom code changes that specify or modify the behavior at set at the time the message broker is compiled or started.

Global Scope: The impact of the code that specifies or modifies the message broker behavior lacks granularity. The codified policy impacts the message broker globally. While it might be possible to apply differences in behavior for different arguments being passed into the policy (including the message and its attributes) it's still a global policy.

Elevated Privilege: To modify the policy code requires elevated privilege such as a message broker admin or developer. Typically, such elevated privileges need to be restricted as much as possible and should not be disseminated to message broker user entities.

Execution of Policy: The code that specifies the message broker behaviors has to execute in the same environment as the rest of the message broker.

Control of Policy: The administrators of the message broker or the developers or integrators have control of the policy code. User entities do not have administrative control of the message broker policy code even when they do have control of some of the arguments that might get passed to the policy code.

Trust Boundaries: The policy code for the message broker executes in the trust domain of the message broker and the message broker has access to all of the information the policy code utilizes.

Message Information: The policy code might have limited access to the information in the message. For instance, the message might be using a syntax the policy code has not been coded to understand or the message might be encrypted and the policy code might not know the key (since the user entity might not want to share the key with the message broker).

External Information: The policy code typically only has access to information within the message broker (including the arguments passed into the code).

Filtering Parameters: When the policy code is static it only supports a limited range of arguments for filtering messages for a subscription. This limits flexibility.

What is Needed in the Art

It would be advantageous to have a message broker in which the user entities of the message broker can dynamically initiate and control programmatic customization of the message broker behaviors for the messaging services they are using, it would be further advantageous for the user entity to be able to initiate different behavior customization for different services, such as different channels, that they are using. It would further be advantageous for different user entities to be able to configure different programmatic customization without affecting the message broker services offered to other user entities. It would further be advantageous to allow the code implementing the programmatic customization of the message broker behaviors access to information external to the message broker and the message and for the code to be under the control of the user entities, allowing the programmatic customization access to sensitive information, such as encryption keys, without exposing the information to the message broker.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Disclosed is a system of one or more storage machines holding instructions executable by one or more logic machines to carry out a method of message broker customization, the method comprising: using at least one logic machine: automatically determining receipt of a user input through a graphical user interface by automatically tracking user operation of the graphical user interface, based to the user input, automatically controlling a specific policy function to be run at a specific policy point, based on the user input, automatically controlling a trust domain of execution environment for the policy function, based on the user input, automatically specifying the policy function to use information available to an execution environment of the policy function, and based on the user input, defining the policy function to cause invoked arguments to be modified to control message flow back to a message broker for continued processing.

In another aspect, the user input modifies which policy function is to be called at a policy point at will.

In another aspect, the user input configures the policy point to control which arguments are passed to the policy function.

In another aspect, the user interface is a graphical user interface.

In another aspect, the user interface is a command line interface.

In another aspect, the user interface is an application programming interface.

In another aspect, the user input specifies different policy functions to call at different policy points.

In another aspect, the method further comprises: defining an authorized user to configure the policy point.

In another aspect, the user input causes the policy function to be modified at will.

In another aspect, the execution environment for the policy function is on one or more user entity controlled resources.

In another aspect, the execution environment for the policy function is on third party controlled resources.

In another aspect, the execution environment for the policy function is made available by a message broker.

In another aspect, the information available to the execution environment includes information passed in by a message broker as arguments.

In another aspect, the method further comprises: based on the user input, dynamically initiating and controlling programmatic customization of a message broker's behavior for messaging services.

In another aspect, the method further comprises: based on the user input, initiating different behavior customization for different services for a first user entity while maintaining message broker services offered to a second user entity.

In another aspect, the method further comprises: based on the user input, initiating programmatic customization access to sensitive information without exposing the sensitive information to a message broker.

Furthermore, disclosed is a method for operating a message broker, the method comprising, receiving a message at a computer-hosted message broker software application, wherein the message comprises one or more message headers, wherein one or more of the message headers identifies a message channel, selecting a function associated with the identified message channel at a predetermined point in the message processing, wherein the message broker is customizable by a message broker user entity at run time for the selection process, invoking the function to perform one or more of the following actions: passing the message unchanged, dropping the message, add, alter, or delete the message body, add, alter, or delete one or more of the message attributes, alter the channel display name, or add, alter, or delete one or more of consumer attributes, where the function runs in a different administrative domain.

In another aspect, the message further comprises one or more of the set of a message body and message attributes.

In another aspect, the function is selected by an administrator for the channel.

In another aspect, the administrator for the channel is not an administrator for the message broker.

In another aspect, the function runs in a different execution environment from the message broker.

In another aspect, the function runs in an administrative domain from the message broker.

In another aspect, the method further comprises returning control of message processing for the message to the messaging broker.

In another aspect, the method further comprises associating consumer attributes with the message, wherein the predetermined point is before consumer attributes are associated with the message and the function is passed message information and the actions of the function affect the message for all consumers of the message.

In another aspect, the method further comprises associating consumer attributes with the message, wherein the predetermined point is after consumer attributes are associated with the message and the function is called for one or more consumers, the function is passed message and consumer information and the actions of the function affect the message for the consumers associated with the consumer information passed to the function.

In another aspect, one or more of the consumer attributes identifies one or more consumers and the function is called for each message/consumer combination.

In another aspect, one or more of the consumer attributes identifies one or more consumers, and wherein one or more of the consumer attributes identifies one or more delivery, protocols to be used for delivery, and wherein the function is called for each message/consumer combination that has an associated consumer attribute specifying a determined delivery protocol.

In another aspect, one or more of the consumer attributes identifies one or more delivery end-points, and wherein one or more consumer attributes containing the delivery end-point is modified by the function.

In another aspect, one or more of the consumer attributes identifies one or more delivery protocols to be used for delivery, and wherein one or more consumer attributes identifying the delivery protocol is modified.

In another aspect, information for consumer attributes for more than one consumer is passed to the function on the same invocation for processing.

In another aspect, the method further comprises the function accessing data external to the message broker and message that is evaluated in selecting the one or more actions to take.

In another aspect, the external data includes information generated by one or more consumers.

In another aspect, the external data includes information generated by one or more application administrators.

In another aspect, the external data includes environmental information.

In another aspect, the environmental information includes date/time information.

In another aspect, the receiving, selecting, and invoking are implemented in any of a) computer hardware, and b) computer software embodied in a non-transitory, computer-readable storage medium.

In another aspect, the method further comprises: receiving a pull request from a consumer requesting a message from a specified channel, selecting a message in the channel to return to the consumer, selecting a function associated with the channel for pull requests, invoking the function to perform one or more actions from the set of: passing the message unchanged, add, alter, or delete the message body, add, alter, or delete one or more of the message attributes, alter the channel display name, or add, alter, or delete one or more of consumer attributes.

In another aspect, the function is selected by an administrator for the channel.

In another aspect, the function is external to the message broker.

Disclosed as yet another example is a data messaging system comprising: one or more message producers configured to communicate messages associated with one or more channels to a message broker, wherein each message comprises one or more message headers, wherein one or more message headers identifies a channel associated with the message, a message broker comprising: one or more channels, one or more connectors to message producers and message consumers, and one or more interfaces to user configurable functions, wherein the message broker is configured to receive a message from a message producer, wherein one or more message headers includes a channel identifier identifying a channel, associate the message with a channel based on the channel identifier, invoke one or more of the user configurable functions, wherein the functions performs one or more of the following actions: pass the message unchanged, drop the message, add, alter, or delete the message body, add, alter, or delete one or more of the message attributes, alter the channel display name, and add, alter, or delete one or more of the consumer attributes.

In another aspect, the system further comprises one or more message consumers configured to receive messages associated with one or more channels on a message broker.

In another aspect, the system further comprises one or more application administrators wherein the application administrator configures the message broker to select the user configurable function.

In another aspect, one or more user configurable functions are external to the message broker.

In another aspect, the system further comprises data external to the message broker wherein the user configurable function utilizes the external data in selecting and performing the one or more actions.

In another aspect, the system further comprises the ability of the user configurable function returning message processing control to the message broker.

In another aspect, one or more of the user configurable functions is called before consumer information is associated with the message, and wherein the user configurable function has access to the message, and wherein modifications to the message by the function affect all copies of the message received by channel consumers.

In another aspect, one or more of the user configurable functions is called after consumer information is associated with the message, and wherein the function has access to the message and the consumer attributes, and wherein modifications to the message by the function affect the copy of the messages received by the consumers identified by the consumer attributes.

In another aspect, the system further comprises the ability of invoking one or more user configurable functions for each message/consumer combination.

In another aspect, the system further comprises the ability of invoking one or more user configurable functions for each message/consumer combination with a specified delivery protocol.

In another aspect, the system further comprises the ability of the user configurable function modifying the delivery end-point.

In another aspect, the system further comprises the ability of the user configurable function modifying the delivery protocol.

In another aspect, more than one set of consumer attributes are passed to the user configurable function at the same time for processing.

In another aspect, the external data includes information generated by one or more consumers.

In another aspect, the external data includes information generated by one or more application administrators.

In another aspect, the external data includes environmental information.

In another aspect, the environmental information includes date/time information.

In another aspect, the message broker is implemented in any of a) computer hardware, and/or b) computer software embodied in a non-transitory, computer-readable medium.

Further disclosed as another example is a computer program product for operating a data message broker, the computer program product comprising: a non-transitory, computer-readable storage medium, and computer-readable program code embodied in the storage medium, wherein the computer-readable program code is configured to receive a message, associate the message with a channel based on a message channel identifier, and invoke one or more user configurable functions, wherein one or more policy functions perform one or more of the following actions: pass the message unchanged; drop the message, add, alter, or delete the message body, add, alter, or delete one or more of the message attributes, alter the channel display name, add, alter, or delete one or more of the consumer attributes, and add; alter or delete one or more of the delivery attributes.

In one aspect of the invention; a data message broker is provided where a user entity of a message broker with authority to create or manage one or more channels in the message broker can input configuration information for the channel to configure interfaces from the channel to invoke user defined policy functions that implement programmatic customization of the message processing and message flow for messages associated with the channel. The authorized user can configure the policy function and parameters of the channel to be invoked at each of one or more policy points in the flow of the message processing in the channel. Because the channel is configurable by the user entities to invoke and specify the parameters for the invocation of policy functions at the policy points the channel can be said to be configurable by the user entities for policy functions. The user entity can configure the invocation of policy functions at run time (while the message broker is running and actively servicing user entity requests). The process of configuring the policy function to invoke at a policy point can also be considered selecting the policy function to be run at that point and the configuration process can be considered the selection process for the policy function. The channel invokes the policy function configured for each of the policy points and provides the policy function with information about the message and optionally information about consumers of the message. The policy function utilizes the information passed to it by the channel along with other information, which may include information external to the message broker and the message, to modify the message and consumer information. The policy function may run in the same execution environment as the message broker or in a different execution environment. The policy function may be in the same administrative domain as the message broker or fall under a different administrative domain. Control of any external information accessed by the policy function is determined by the administrator of the policy function and its execution environment. The policy function then passes the modified information back to the channel. The channel continues processing the modified message.

In another aspect of the invention, a method is provided for operating a data messaging system, the method including receiving at a computer-hosted software application a message associated with a channel wherein the channel processes the message until reaching a predetermined policy point and determining if a policy function has been configured for that policy point. If a policy function has been configured for the policy point the method further includes invoking the policy function, passing on information about the message and optionally information about the intended consumers of the message, and if a policy function has not been configured for that policy point continuing the processing of the message without invoking a policy function at that time. Multiple policy functions can be invoked at different policy points during the processing of a message. The method further includes the channel receiving a response from the policy function including message information and optionally consumer information, either or both of which may have been modified by the policy function, and the channel resuming processing of the message following the point from where the policy function was invoked. The method further includes a channel receiving a pull request from a consumer requesting a message from a channel, selecting a message for fulfilling the request, and determining if a policy function has been configured for a policy point related to the pull request for the message selected to fulfill the request and if so invoking the policy function, passing the policy function message information and optionally consumer information.

In other aspects of the invention, systems and computer program products embodying the invention are provided.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1A:
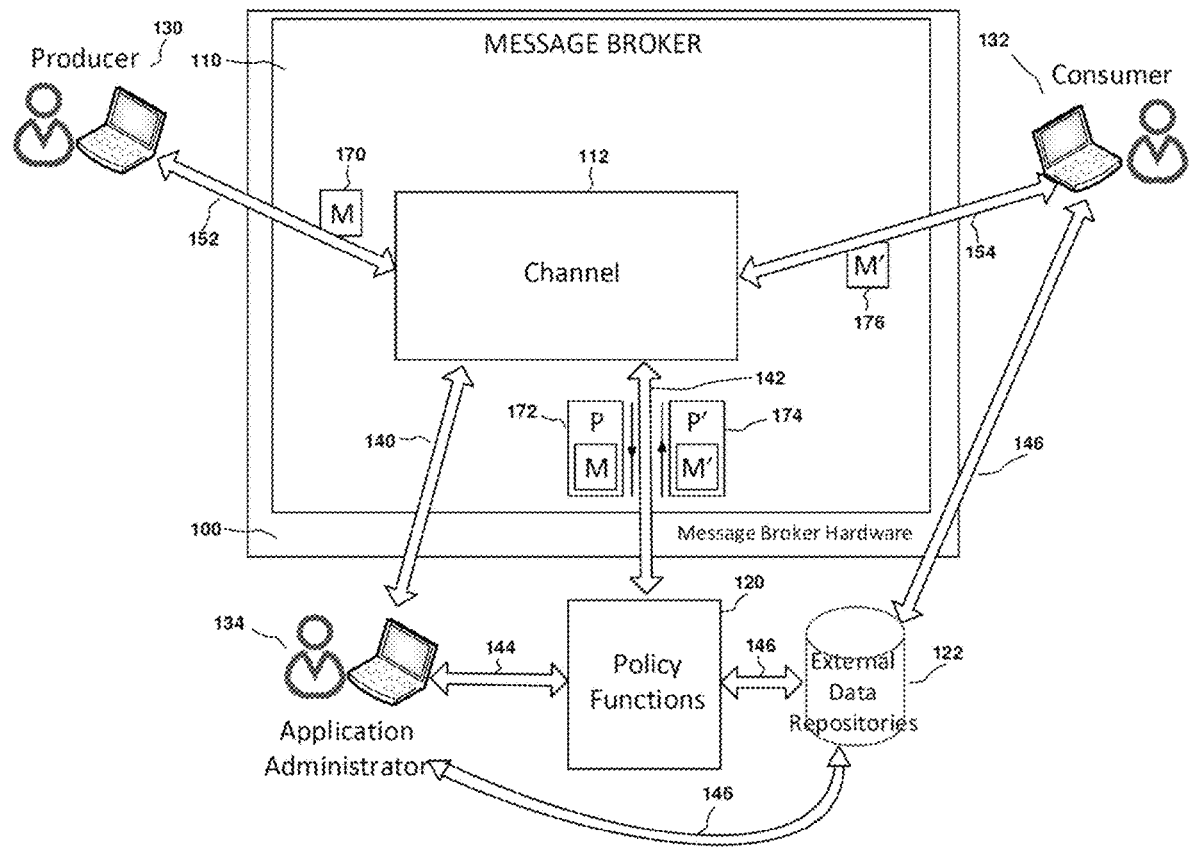
FIG. 1A schematically shows a simplified conceptual illustration of a data messaging system with a user configurable interface to a policy function, constructed and operative in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Generally introducing the invention, disclosed is a system and method for message broker customization with user administered policy functions. First, central to the uniqueness of the invention is a clear definition of the differences between a program or function and argument or parameters that are passed into that program or function. Functions, including policy functions, are groups (blocks) of computer readable program instructions grouped together that can be invoked to complete one or more tasks. A function is a block of code that can be run on a computer. Arguments or parameters are data that can be passed to a function that the function can utilize in its execution. Changing what arguments (or parameters), or argument values, are passed into a function can modify the results of the execution of the function (but do not actually modify the function itself). A function is only going to perform the task(s) it's been programmed to do and the arguments will only vary the results of the function execution within the bounds of that programming.

A message broker is a program, or large block of code, with numerous smaller blocks of code, be they called procedures, functions, or objects, for completing one or more tasks. Some of these blocks of code control the possible behaviors of a message broker when it receives a message. Often these blocks of code can take arguments that affect the behavior of the message broker (within the bounds of what the code allows). Two of the possible ways to customize the behavior of a message broker for a particular purpose are to change one or more of the blocks of code (that contain the rules for the behavior) or change the input to those blocks of code to vary the behavior within the bounds of the rules set forth by the code. A message broker may allow for both.

At the heart of the disclosure is the ability to allow user entities of the message broker to customize the behavior of the message broker by modifying the code (the functions) that when executed determine Message Broker behavior. This approach is fundamentally different from solutions that allow user entities of the message broker to simply modify/vary the input into that code. One of the major benefits of customizing the behavior of the policy function by customizing the actual code is the greatly increased range of customization possible.

One of the characteristics of the disclosed system and method is that they allow for the specification of the code that controls message broker behavior (the policy function). The resultant greater flexibility of message broker behavior control is a significant distinguishing feature from any prior art that is only modifying arguments/values passed into the code.

Furthermore the unique way in which the disclosed system allows the policy function to be specified, controlled, and executed by resources provided by the user entity of the message broker allows for numerous additional advantages over the prior art.

Following is a general introduction to the benefits of the disclosed systems and methods:

Dynamic Customization: The policy function can be modified at any time without any need to restart the message broker. As well, what policy function is to be invoked can be changed at any time.

Granular Scope: The specification of the policy function to invoke can be specific for each unique processing point (policy point) in the message broker message flow as well as unique for each resource.

User Entity Privilege: Specification or modification of the policy function can be accomplished by authorized message broker user entities for resources they own/control.

Execution of Policy: The policy function doesn't have to execute in the message broker environment. The message broker user entity is able to specify where the policy function is to execute including on resources provided by the user entity. For instance, the user entity might specify an AWS lambda function or an EC2 instance they are running in their account. This allows the user to pay for the resources to run the policy function rather than requiring the resources to be consumed out of the message broker environment.

Control of Policy: The message broker user entity is able to specify/modify the policy function and has administrative control of the policy function.

Trust Boundaries: Since the user entity is able to specify the execution location of the policy function they are able to control within what trust domain the policy function executes, be it the trust domain of the message broker, the trust domain of the user entity, or the trust domain of a 3rd party. For instance, if the user entity wants to evaluate the contents of the message in the policy function but the message is encrypted, or if the policy function is executing in the trust domain of the user entity the user entity can pass the encryption key into the policy function without sharing it with the message broker.

Message Information: If the user entity is specifying the policy function for message channels they own, they can specify policy functions that understand custom message formats they may be using. As well, if the message is encrypted they can pass in the encryption key when the policy function is invoked in an environment they control.

External Information: The user entity can determine what information the policy function has access to, be it the message headers, message body, message attributes, consumer information, external data bases, or essentially any information that can be accessed over the Internet or a connected private network.

Filtering Parameters: Since the user entity has control of specifying and modifying the policy function there is great flexibility of what information is utilized when filtering messages for a subscription.

Furthermore, the systems and methods disclosed herein have the following unique features:

Policy Point Configuration: User entity can control what policy function is to be run at policy points for resources the user entity owns (such as channels) and is able to modify what policy function will be called at a policy point at will. The Policy Point configuration also controls what arguments are passed to the policy function. As well, the user entity can specify different policy functions to run at different policy points.

Privilege Level: The entity configuring the policy point must be authorized to do so. Usually, the owner of the resource of an entity they have authorized to authorize entities must authorize the entity to configure the policy point.

Policy Function Specification/Modification: The user entity provides the specification and is able to modify the policy function at will. The user entity controls the policy function.

Policy Function Execution Location: The user entity controls where the policy function will execute. This also allows the user entity to control what resources are consumed by the execution of the policy function and control the trust domain of execution environment for the policy function. The execution environment could be on user entity controlled resources, 3rd party controlled resources, or on resources made available by the message broker.

Policy Function Information Availability: The policy function can be specified to use any information available to the policy function's execution environment which could include information passed in by the message broker as arguments such as message information and consumer information and any other information selected to be passed in, external databases, private data that is available to the policy function execution environment, and virtually everything on the Internet if Internet access is available to the policy function execution environment. This can include information not available in the message broker environment.

Modify Information and Return Control: The policy function can modify the arguments received when invoked and return information and control of message flow back to the message broker for continued processing.

Figure 7:
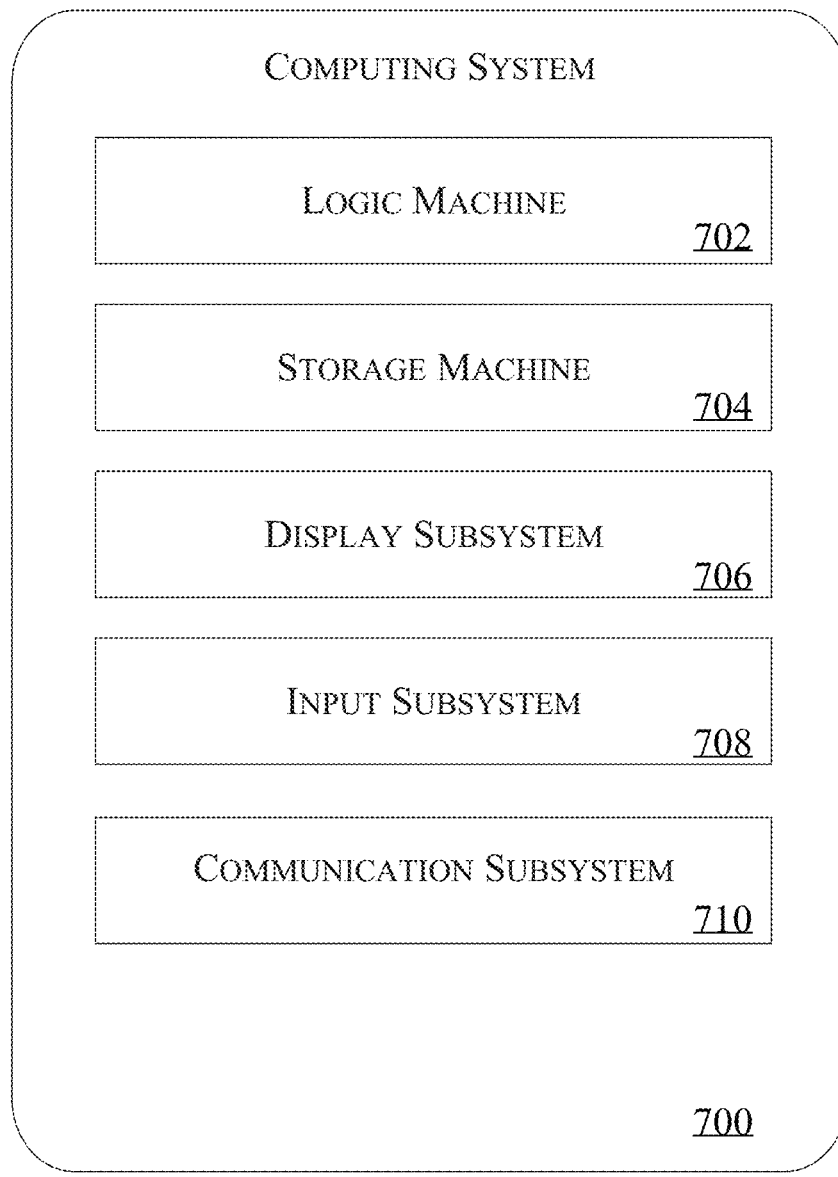
FIG. 7 schematically shows an exemplary computing system in accordance with aspects of the present disclosure.

In some embodiments the methods, tasks, processes, and/or operations described herein may be automatically effected, executed, actualized, and/or carried out by a computing system including a tangible computer-readable storage medium, also described herein as a storage machine, that holds machine-readable instructions executable by a logic machine i.e. a processor or programmable control device) to effect, execute, actualize, carry out, provide, implement, perform, and/or enact the above described methods, processes, operations, and/or tasks. For example, a suitable computing system may be computing system 700 shown in FIG. 7. When such methods, operations, and/or processes are implemented, the state of the storage machine 704 may be changed to hold different data. For example, the storage machine 704 may, include memory devices such as various hard disk drives, CD, or DVD devices. The logic machine 702 may execute machine-readable instructions via one or more physical information and/or logic processing devices. For example, the logic machine 702 may be configured to execute instructions to perform tasks for a computer program. The logic machine 702 may include one or more processors to execute the machine-readable instructions. The computing system 700 may include a display subsystem 706 to display a graphical user interface (GUI) or any visual element of the methods or processes described above. For example, the display subsystem 706, storage machine 704, and logic machine 702 may be integrated such that the above method may be executed while visual elements of the disclosed system and/or method are displayed on a display screen for user consumption. The computing system 700 may include an input subsystem 708 that receives user input. The input subsystem 708 may be configured to connect to and receive input from devices such as a mouse, keyboard or gaming controller. For example, a user input may indicate a request that a certain task is to be executed by the computing system 700, such as requesting the computing system 700 to display any of the above described information, or requesting that the user input updates or modifies existing stored information for processing. A communication subsystem 710 may allow the methods described above to be executed or provided over a computer network. For example, the communication subsystem 710 may be configured to enable the computing system 700 to communicate with a plurality of personal computing devices. The communication subsystem 710 may include wired and/or wireless communication devices to facilitate networked communication. The described methods or processes may be executed, provided, or implemented for a user or one or more computing devices via a computer-program product such as via an application programming interface (API).

As a non-limiting example, the disclosure teaches action by a processor to execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented. Therefore the disclosed technical solutions eliminate or alleviate these problems and positively contribute to the technical abilities of existing computing systems and methods.

As a non-limiting example of such a practical application, embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (for example using an Internet Service Provider), or the connection may be made to external computers. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to schematic flowchart illustrations and/or block diagrams of methods, apparatus systems), functions, and computer program products according to embodiments of the invention. It will be understood that each block of the flowchart illustrations and/or block diagrams, and combinations of blocks in the flowchart illustrations and/or block diagrams or functions, can be implemented by computer readable program instructions. Functions, including policy functions, are groups of computer readable program instructions grouped together that can be invoked to complete one or more tasks.

These computer readable program instructions may be provided to one or more processors of one or more general purpose computers, special purpose computer, or other programmable data processing apparatus to produce a machine, such that the instructions, which execute via the processors of the one or more computers or other programmable data processing apparatus, create means for implementing the functions/acts specified in the flowchart and/or block diagram block or blocks. These computer readable program instructions may also be stored in one or more computer readable storage mediums that can direct one or more computers, programmable data processing apparatuses, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the one or more computers, other programmable apparatuses or other device to produce a computer implemented process, such that the instructions which execute on the computers, other programmable apparatus, or other devices implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Throughout this specification a distinction is made between a user entity of a product, application, service or system (referred to hereafter as product), an administrator of a product, an implementor of a product, and a developer of a product. These are different exemplary roles under which an entity can operate in the life cycle of a product. In the context of this specification a user entity of a product is the ultimate consumer or intended ultimate consumer of the product. An administrator of a product provides ongoing support and maintenance for the product and generally has different access and authorization requirements than the user entities. Administrative access to a product or system is often referred to as elevated access or authorization. The administrator will require ongoing access and elevated authorization to the product and possibly some access and authorization to the underlying systems throughout the active life of the product. An implementer of a product installs the product on the underlying systems that support the product and brings the product to an operational state. An implementer requires access and authorization to the product and the underlying systems supporting the product or service while the product or service is being installed or during upgrades, but does not require ongoing access and authorization. A developer of a product requires access and authorization to development and test resources for developing a product but does not require access to the production product or underlying systems. The developer implements the features in the product to meet the user entity's requirements using development systems that should be isolated from the production systems while an implementor installs what a developer has implemented on the underlying production systems. Each of these roles have different access and authorization requirements to the product and the underlying systems. It is possible for a single entity, person or system, to function in more than one role at different times.

It is also possible for a single entity, person or system, to have different roles on different products or underlying systems. For instance, a user entity of a message broker is not necessarily a user of the underlying systems implementing the message broker but the message broker is a user entity of the underlying systems (such as computer, memory, or storage systems). An administrator for the message broker might not need direct access to the underlying systems implementing the messaging system, might just need user access and authorization to one or more of the underlying systems, or might need elevated authorization to one or more of the underlying systems.

FIG. 1A

Reference is now made to FIG. 1A, which is a simplified conceptual illustration of a data messaging system with a user configurable interface to a policy function, constructed and operative in accordance with an embodiment of the invention.

Messaging System Components

In the system of FIG. 1A, a messaging system is shown. A messaging system is a system that allows messages to be sent between messaging system user entities. A messaging system user entity is an entity capable of generating information to be communicated via the messaging system to one or more other entities and/or receiving information via a messaging system from one or more other entities. Examples of such messaging system user entities include but is not limited to human users, other software applications, programs or program products, computer processes running on the same compute resources, or external computing systems. A message is a discrete unit of communication intended by the producing messaging system user entity to be consumed by one or more other messaging system user entities.

Included in the messaging system is one or more message Producers 130, one or more Message Brokers 110, and one or more message Consumers 132. A message producer, also referred to as just a producer, is the part of the system that: interacts with a messaging system user entity, processes the information from the user entity and formats the message, and sends a message containing the information to the message broker. The message producer is considered to be a part of the messaging system while the messaging system user entity is not considered to be a part of the messaging system. The message producer may run on the same hardware as the messaging system user entity, or the same hardware as the message broker, or hardware distinct from both the messaging system user entity and the message broker. A message consumer, also referred to as just consumer, is the part of the messaging system that receives a message from a message broker and interacts with a messaging system user entity to communicate the information from the received message from the message broker to the messaging system user entity. The message consumer is considered to be a part of the messaging system while the messaging system user entity is not considered to be a part of the messaging system. The message consumer may run on the same hardware as the messaging system user entity, or the same hardware as the message broker, or hardware distinct from both the messaging system user entity and the message broker. A message broker is a system that translates messages from the format used by the message producer to the format used by the message consumer and allows for asynchronous delivery of messages decoupling the communication between the message producer and message consumer. Message producers and consumers are user entities of a message broker (they make use of the services the message broker provides). It is possible for message Producers 130 and message Consumers 132 to be implemented in the same application or program product as Message Broker 110, as standalone programs, as part of other software programs or applications, or as part of a program for interfacing with a human user. This is not intended to be an exhaustive list of methods for implementing message Producer 130 and message Consumer 132. Other methods of implementing message Producer 130 and message Consumer 132 are not outside the scope of this disclosure. For simplicity, since the focus of this invention is on the message broker, the message producer and messaging system user entity for producing messages are combined in FIG. 1A and simply referred to as Producer 130. In the same way, the message consumer and messaging system user entity for consuming messages are combined in FIG. 1A and simply referred to as Consumer 132.

Also depicted in FIG. 1A is an Application Administrator 134 for an application that is making use of the messaging system, Policy Functions 120 for customizing the message processing of the message broker, and External Data Repositories 122 available to Policy Functions 120. An application can be (but is not limited to) computer software that provides one or more services for user entities (which can include but is not limited to humans, computer programs, processes, or other applications). In the context used here applications can also include programs for end users (humans), operating systems, utilities, and programming tools as well as other types of computer programs. An application administrator would be responsible for tasks such as updating, tuning, monitoring performance, and diagnosing problems with the application. Application Administrator 134 is an administrator for an application that is utilizing Message Broker 110 as a part of providing services to the application's user entities. While Application Administrator 134 may also be an administrator for Message Broker 110 that does not need to be and often will not be the case. The application is a user entity of Message Broker 110's services and Application Administrator 134 only needs sufficient access and authorization to Message Broker 110 to support the application's use of Message Broker 110's services, A message broker administrator has elevated access and authorization to the message broker systems and possibly underlying systems to provide for ongoing support and maintenance of the message broker.

Message brokers interact with message producers and message consumers through one or more messaging protocols. A messaging protocol defines the rules and conventions for interactions between a message broker and its user entities such as message producers and message consumers. The protocol includes mechanisms for the user entities to identify themselves, how to connect to the message broker, and how to format messages sent between the message broker and its user entities. Examples of well-known message protocols include MQ Telemetry Transport (MQTT), Advanced Message Queuing Protocol (AMQP), and Streaming Text Oriented Message Protocol (STOMP) for communication between Message Brokers 110 and message Producers 130 or message Consumers 132. Custom or proprietary data message protocols can also be used. The protocol used to deliver a message to a consumer can also be referred to as the delivery protocol for that message.

Channel

A component of Message Broker 110 is a Channel 112 for processing received Messages 170. A message channel, also referred to as just a channel, such as Channel 112, is a logical way of specifying a particular set of processing steps and a processing or delivery path for a received message. Two common classes of channels are queues and topics, with variations of each. A message placed on a queue is typically only consumed once and the consumer retrieves the message by initiating a pull request. A pull request is a process where the consumer requests a message from a specified queue and the channel attempts to fulfill that request with a message from the specified queue, though this is a very simplified description of the process. A topic is used for a publish/ subscribe system. A producer publishes messages to a topic (optionally also categorizing the message using message attributes or similar meta-data).

Consumers express interest in a topic by subscribing to it. A subscription specifies the topic and optionally what categories are of interest to a consumer. When a producer publishes a message to the topic the message broker distributes the message to all consumers that have expressed interest in the message via their subscription, though this also is a very simplified description of the process.

Typically, Message Broker 110 has more than one Channel 112 providing more than one message delivery path for message Producers 130 and message Consumers 132 and the protocols used for communication between message Producers 130 and message Consumers 132 and Message Broker 110 allows specification of which Channel 112 should be used for a communication (for example sending or receiving a message). In an exemplary sequence, message Producer 130 connects to Message Broker 110, sets up a Session 152 associated with Channel 112, generates Message 170, and delivers Message 170 to Channel 112 over Session 152. A session, such as Session 152, is a stateful communications path between Message Broker 110 and one of its user entities (such as Producer 130 or Consumer 132), In this example, Session 152 is associated with a specific Channel 112 on Message Broker 110. It is also possible to establish communications between message brokers and their user entities (such as producers and consumers) without using sessions and or state and such implementations are not outside the scope of this invention.

A channel has a set of steps in processing messages received for the channel. This can be referred to as the message processing or the processing path for the channel, A point in the message processing where the channel can be configured to invoke a policy function is referred to as a policy point. Typically, policy points are predetermined points in the message processing, referred to as predetermined points. The message processing for a channel may or may not have a policy function invocation configured at any specific policy point. Channel 112 processes Message 170 and if it reaches a policy point where Channel 112 is configured to invoke a Policy Function 120, Channel 112 generates a Policy Function Message 172 and invokes Policy Function 120 over a Policy Function Interface 142. Policy Function 120 returns a Modified Policy Function Message 174, Channel 112 retrieves the Modified Message 176 from Modified Policy Function Message 174, and Channel 112 resumes processing Modified Message 176 according to the processing path in place for Channel 112. During the processing, a list of potential Consumers 132 of Modified Message 176 is selected and Channel 112 delivers Modified Message 176 to Consumer 132 over the Session 154 that Consumer 132 has established with Channel 112. It is possible for Policy Function 120 to influence or alter the selection process for the list of potential Consumers 132 for Modified Message 176.

The configuration of Channel 112 to invoke Policy Function 120 is performed by a message broker user entity, such as Application Administrator 134, who has been authorized to make such configuration changes to Channel 112 using a Channel Configuration Interface 140. Being authorized to make such changes can be seen as being a message broker message broker user entity with administrative privileges for a group of one or more channels, which can be seen as being an administrator of the channel, and which is not the same as being an administrator for the message broker itself. It is possible for the creation of channels to be user controlled services provided by the message broker and when a message broker user entity creates a channel they may have authorization to configure or delete the channel. A channel configuration interface is an interface provided by the message broker to allow the authorized entity to create, configure, and delete channels. Examples of possible Channel Configuration Interfaces 140 include an administrative console provided by Message Broker 110, a command line interface provided by Message Broker 110, or using an Application Programming interface (API) provided by Message Broker 110 for authorized users. The configuration might also be entered by an authorized program.

Messages

Message brokers interact with message producers and message consumers through one or more protocols where the protocol in use will determine the format for the messages.

Different connections to the message broker can use different protocols and different message formats. Many of the protocols for a message broker to communicate with message producers and message consumers have message formats that include two or more distinct parts: a message header section that contains system-level information such as the destination (topic or queue), session id, or time sent that the message broker will need to inspect, understand, and act upon and possibly even modify; and a message body that contains the application message being communicated and its associated meta-data that the message broker typically will not inspect. The actual format of the content within the message body is typically application specific.

However, some protocols allow a message publisher to also associate message attributes with the message that the message broker can easily inspect and utilize for message processing. When present, some options for the placement of these attributes include placement in a message header section, placement in the message body section but with the message broker having at least a partial knowledge of the message body section, or the inclusion of an additional message section for message attributes that can be accessed and utilized by the message broker. The message broker accessible message attributes do not all have to be placed in the same part of the message. Not all messages will have a message body. For instance control messages used to set up or disconnect Session 152 or Session 154 might not have a message body. Typically, a message broker may inspect and act upon message headers and possibly included message attributes but will not inspect or take any actions based on any other information in the message body. However, a policy function can easily be written for an application or channel that has additional understanding of the format and semantics of the message body for that application, and inspects and acts upon information in the body of the message. In situations where the message body, or portions of the message body, is encrypted it is even possible for the application to provide the policy function with the decryption keys for the message allowing it to still inspect and act upon the information in the message body.

Message 170 is an example of a message between Producer 130 and Message Broker 110. In this exemplary implementation, control Message 170s can be exchanged between Producer 130 and Message Broker 110 establishing Session 152 with Channel 112. In this case, additional Message 170s associated with Session 152 may include a session identifier or session ID as one of the message headers. The session ID can also be considered to be a channel identifier since identifying the session also identifies the channel that is the destination or source of the message.

Alternate embodiments that possibly don't utilize sessions can include some other form of channel identifier in the message header for identifying the destination or source channel for the message. Some message 170s include a message body (which contains application message information intended for message Consumer 132s).

Modified Message 176 is an example of a message between Message Broker 110 and Consumer 132. In this exemplary implementation; control Modified Message 176s can be exchanged between Consumer 132 and Message Broker 110 establishing Session 154 with Channel 112. In this case, additional Modified Message 176s associated with Session 154 may include a session identifier or session ID as one of the message headers. The session ID can also be considered to be a channel identifier since identifying the session also identifies the channel that is the destination or source of the message. Alternate embodiments that possibly don't utilize sessions can include some other form of channel identifier in the message header for identifying the destination or source channel for the message. Some Modified Message 176s include a message body which contains application message information generated by message Producer 130 intended for one or more message Consumers 132. With a current art message broker some of the message headers may have changed as the message is processed by the channel, but typically the message body will be unchanged. With the use of policy functions the message body may also have been modified by the policy function. Another message header that can be included in Modified Message 176 is a channel display name. This contains or identifies a human readable name that should be displayed to the end user for messages from the channel.

Channel 112 provides Policy Function 120 with parameters or arguments when invoking Policy Function 120. In one or more embodiments of the invention the parameters or arguments will be passed in Policy Function Messages 172 and the return parameters or arguments from Policy Function 120 will be passed in Modified Policy Function Messages 174. In one or more aspects of the invention the creation and passing of Modified Policy Function Message 174 is to be considered calling the Policy Function 120. Other embodiments of the invention may pass the parameters or arguments in different ways but are still within the scope of this invention. The information included in Policy Function Message 172 and Modified Policy Function Message 174 are illustrative of the type of information that is passed to and from Policy Function 120 on invocation.

In accordance with the invention, Policy Function Message 172 includes message information about Message 170 as one or more of the parameters. Message information is information that can allow the policy function to access some or all of the message to be processed. Depending on the implementation the message information can be communicated in different ways. For example, the message information can be a copy of the entire Message 170, a pointer or reference to Message 170, a copy of select sections of Message 170 such as message headers or message attributes. As well, Policy Function Message 172 may include message information about multiple Message 170s. This should not be taken as an exhaustive list of possible ways to include message information in Policy Function Message 172 and is not intended to limit this invention to only these ways of including message information.

An example of a message reference is a pointer to a location in a message store accessible by both Channel 112 and Policy Function 120. A message store can be a file system or database that stores the message after the message broker receives it. Channel 112 has read/write access to the message store and stores Message 170 in the message store. Policy Function Message 172 has a pointer to the location of Message 170 in the message store and Policy Function 120 is able to use the pointer to access Message 170. Policy Function 120 can have read/write access to Message 170 in the message store if it will need the capability to modify Message 170 or Policy Function 120 can be allowed read only access to allow it to use but not modify the information in Message 170. When Policy Function Message 172 includes references to multiple messages this can be accomplished by including multiple pointers into the message store in the Policy Function Message 172. When Channel 112 splits the processing into multiple branches and more than one branch may modify Message 170 multiple copies of Message 170 can be placed in the message store and different Policy Function Message 172s can receive a pointer to different copies of Message 170.

Policy Function Message 172 may also include other information in addition to message information. For instance, Policy Function Message 172 may include consumer information about potential message Consumers 132 including consumer attributes. Consumers of messages associated with a particular channel can be referred to as channel consumers for the channel. Consumer information is information that can allow the policy function to access consumer attributes about some or all of the potential consumers of a message. The information about message Consumers 132 could be the consumer attributes of a single message Consumer 132 or the consumer attributes about multiple message Consumers 132. The information about message Consumers 132 could include consumer attribute information about all potential message Consumers 132 for Message 170, all Message Consumers 132 that utilize a specified protocol for message delivery, or a specific Message Consumer 132. Consumer information can be consumer attribute information about the Consumers 132 or a pointer or reference to consumer attribute information about Consumers 132. Other criteria for selecting message consumer information are also possible and within the scope of this invention. Message consumer attribute information may include, among other information, a consumer identifier, a delivery protocol, a delivery end-point, or a subscription identifier. Examples of other types of information that may be included in Policy Function Message 172 includes a correlation identifier, and a reply end-point identifier. A consumer identifier would be an identifier that can uniquely identify a message consumer within the domain of the message broker. A deliver protocol is the protocol to be used for delivering a message to a message consumer. Example delivery protocols include MQTT, AMQP, STOMP, HTTP, SMS, SMTP. A delivery end-point is the consumer for a particular message. Delivery attributes are a group of attributes related to the delivery of a message. The identifiers of the delivery protocol and the delivery end-point can be considered delivery attributes. A subscription is a consumers registration for requesting information published to a particular channel or topic including the information provided at the time of registration. A subscription identifier is an identifier identifying a particular subscription. A message correlation identifier is an identifier that associates multiple messages with one another. For instance a response to a request could include a message correlation identifier to associate the response with the request. If a message is split into multiple sub-messages, the sub-message could include a correlation identifier to associate the sub-messages with one another. A reply end-point identifier is an identifier indicating where a response from the policy function should be sent. An example of a reply end-point identifier is an identifier for a queue to which reply messages should be sent by a policy function.

In accordance with the invention, Modified Policy Function Message 174 includes message information about Modified Message 176. Depending on the implementation the message information could be communicated in different ways. For example, the message information could be a copy of the entire Modified Message 176, a pointer or reference to Modified Message 176, or a copy of select sections of Modified Message 176 such as message headers or message attributes. If Policy Function 120 did not modify Message 170 or Modified. Message 176 in place in a message store then Modified Policy Function Message 174 may include the same pointer to the message in the message store for Modified Message 176 as it received as the pointer to Message 170 in Policy Function Message 172. As well, Modified Policy Function Message 174 may include information about multiple Modified Message 176s. This should not be taken as an exhaustive list of possible ways to include modified message information in Modified Policy Function Message 174 and is not intended to limit this invention to only these ways of including modified message information.

Modified Policy Function Message 174 may also include other information in addition to message information. For instance, Modified Policy Function Message 174 may also include consumer information about potential message Consumers 132 including consumer attributes. The information about message Consumers 132 could be consumer attributes about a single message Consumer 132 or consumer attributes about multiple message Consumers 132. The information about message Consumers 132 could be consumer attributes about all potential message Consumers 132 for Modified Message 176, all message Consumers 132 that utilize a specified protocol for message delivery, or a specific message Consumer 132. Other criteria for selecting message consumer information are also possible and within the scope of this invention. Message consumer attributes may include, among other information, a consumer identifier, a delivery protocol, a delivery end-point, or a subscription identifier. An example of other information that may be included in Modified Policy Function Message 174 is a correlation identifier.

All the examples of information that may be included in Policy Function Message 172 and Modified Policy Function Message 174 are illustrative and not limiting to the scope of the invention. Not all the information in the examples needs to be included in Policy Function Messages 172 and Modified Policy Function Message 174 and additional information beyond the examples mentioned here are possible and within the scope of the invention.

In one or more embodiments, the number of Message 170 messages for which Policy Function Message 172 includes message information does not need to be the same as the number of Modified Message 176 messages for which the corresponding Modified Policy Function Message 174 includes message information. As well, in one or more embodiments, the number of Policy Function Messages 172 does not need to be equal to the number of corresponding Modified Policy Function Messages 174. This allows for Policy Function 120 to: drop messages for message filtering; split messages into multiple sub-messages; and aggregate multiple messages or sub-messages into fewer messages, as well as other messaging patterns. Nor does the number of message Consumers 132 about which Policy Function Message 172 includes consumer information need to be equal to the number of message Consumers 132 about which Modified Policy Function Message 174 includes consumer information. This helps support message filtering as well as other messaging patterns. Dropping a message indicates a message is no longer going to be processed and delivered to a particular message consumer or group of consumers. Splitting a message indicates the message content is going to be split out into multiple messages or sub-messages for continued processing which could include delivering multiple messages to a specific message consumer or group of message consumers.

Aggregating messages indicates multiple messages or sub-messages are combined into fewer messages for continued processing which could include delivery of one or more of the combined messages to a particular message consumer or group of message consumers.

Policy Functions

A policy function is a function that can be inserted into the processing path of a channel for messages received by a message broker in order to customize the processing of the message.

In accordance with the invention, Policy Function 120 receives Policy Function Message 172. Policy Function 120 is a programmatic embodiment of the behavior modification of Channel 112's processing of message 170. FIG. 1A illustrates Policy Function 120 executing on hardware distinct from the Message Broker Hardware 100 but it is also possible for Policy Function 120 to execute on Message Broker Hardware 100 either in the same virtual machine (VM) as Message Broker 110 or a different VM (if Message Broker 110 executes in a VM).

In one or more embodiments of the invention, Policy Function 120 is created or modifiable by authorized user entities of the message broker. For example, Application Administrator 134 may also be authorized to install Policy Function 120 on whatever system Policy Function 120 executes. Policy Function 120 may also have a Policy Function Configuration Interface 144 allowing users authorized to administer Policy Function 120 to install, configure, modify, or delete Policy Function 120.

External Data

In accordance with the invention, Policy Function 120 may access data outside the domain of the message broker in executing the programmatic policy identified by the authorized user and instantiated in Policy Function 120. This data can be referred to as external data. FIG. 1A illustrates this through depicting External Data Repositories 122. External Data Repositories 122 represents any data outside of the message broker and message that Policy Function 120 accesses and utilizes during its execution. External Data Repositories 122 can be any number of different sources of data and can have any number of different interfaces for adding, deleting, modifying, or reading the data. In the simplified system depicted in FIG. 1A all of the various possible methods of accessing External Data Repositories 122 are represented by the External Data Repository Interface 146. Any source of data that Policy Function 120 can access is a potential source of external data for Policy Function 120 to utilize in its programming. This could include, among other possible sources, data provided by: Application Administrator 134, messaging system user entities of message Consumer 132, messaging system user entities of message Producer 130 (access not depicted in FIG.), environmental information or values like date, time, temperature, status of some other program, location. Virtually any source of information can be utilized.

Implementation

Message Broker 110 and Policy Function 120 are preferably implemented, in accordance with conventional techniques, as computer applications embodied in computer hardware and/or in computer software embodied in a non-transitory, computer-readable medium, and are hosted by one or more computers.

FIG. 1B

Figure 1B:
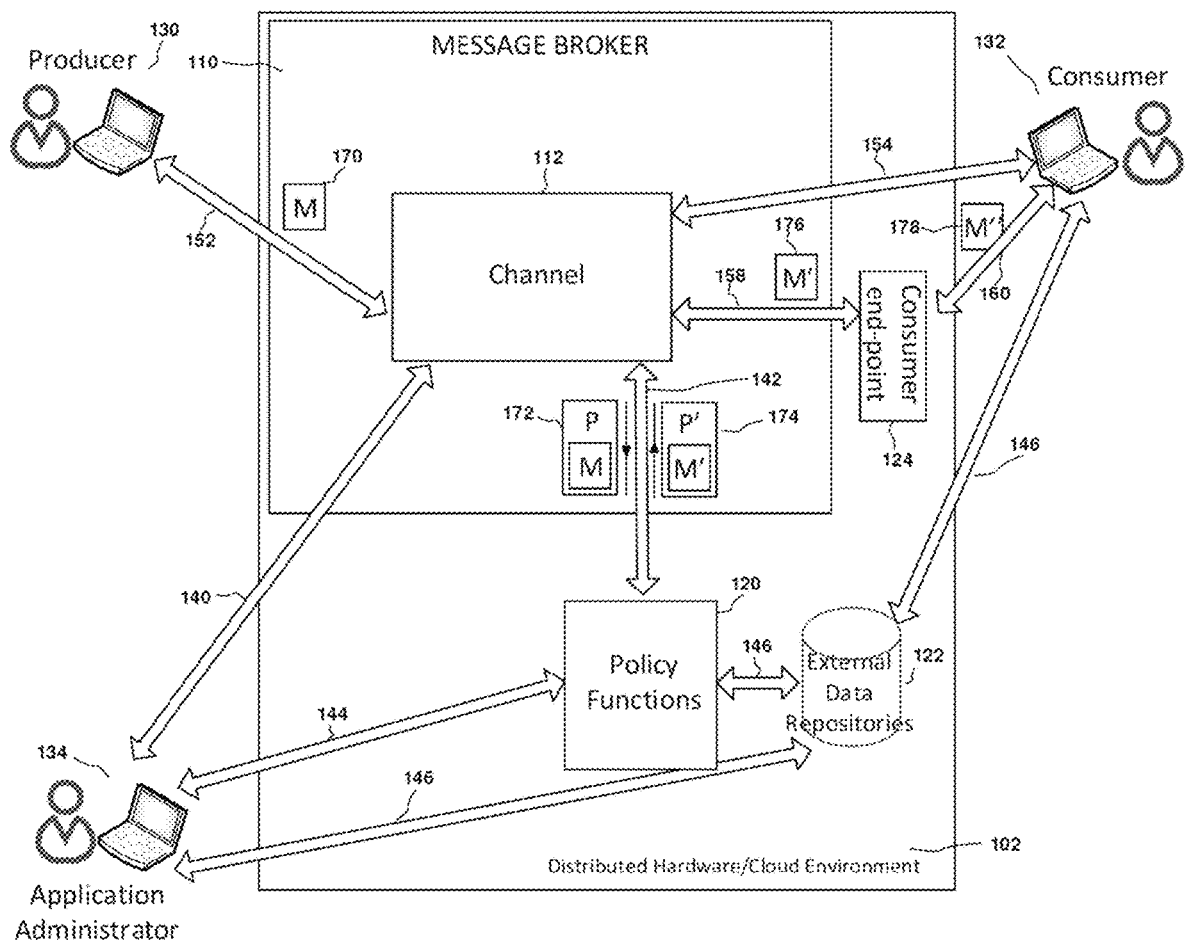
FIG. 1B schematically shows a simplified conceptual illustration of a data messaging system with a user configurable interface to a policy function further illustrating the use of distributed hardware, constructed and operative in accordance with aspects of the present disclosure.

Features of additional embodiments of the invention are depicted in FIG. 1B which is a simplified conceptual illustration of a data messaging system with a user configurable interface to a policy function further illustrating the use of distributed hardware, constructed and operative in accordance with an embodiment of the invention. The system of FIG. 1B is very similar to the system of FIG. 1A. The key differences between FIG. 1A and FIG. 1B will now be highlighted.

Distributed Hardware/Cloud Computing

Distributed programs are often designed to operate across a number of independent computing resources linked by one or more networks allowing for the communication of information between the independent computing resources to accomplish the distributed programs goals. The independent computing resources and the linking network resources are referred to as the distributed hardware for the program. FIG. 1B depicts Message Broker 110 and Policy Function 120 on the same collection of Distributed Hardware 102, In this example, Distributed Hardware 102 is a shared pool of configurable system resources and higher-level services with orchestration in place to allow easy access to the resources with rapid provisioning and minimal management effort. This is often referred to as Cloud computing. This cloud computing environment, which will also be referred to as the cloud environment, can be a private cloud perhaps orchestrated by a suite of software and protocols such as openstack, or it can be a public cloud environment such as those provided by Amazon (Amazon Web Services—AWS), Google (Google Cloud Platform—GCP), Microsoft (Azure), IBM (IBM Cloud Services), Oracle (Oracle Cloud), and many others. While FIG. 1B is focused on a Cloud environment it is not intended to be limiting and other distributed hardware environments are not outside the scope of this invention.

Message Broker with Cloud

In a cloud environment, Message Broker 110 may be implemented by a user entity of the cloud environment with the cloud environment provider providing Infrastructure as a Service (IaaS), such as AWS' Elastic Compute Cloud (EC2) or Google's Google Compute Engine (GCE) on which the user entity implements and manages Message Broker 110. Another options could be where the cloud environment provider offers Message Broker 110 as a Platform as a Service (PaaS) offering such as AWS' Amazon MQ offering of Apache ActiveMQ. In this case AWS takes care of the implementation and maintenance and provides the user entity the ability for other administration aspects of Message Broker 110. Yet another option is where the cloud environment provider offers the services of Message Broker 110 as a service to the users. This would be a Service as a Service (SaaS) and examples of this are AWS Simple Notification Service (SNS), AWS Simple Queue Service (SQS), and Google's Cloud Pub/Sub. It's also possible for a cloud environment provider to implement Message Broker 110 internally as an underlying system for providing the cloud computing environment and not expose its service to the users of the Cloud environment directly. An example of this would be the Message Queuing Telemetry Transport (MQTT) message broker imbedded in the AWS Internet of Things (IoT) offering.

Policy Function with Cloud

In a cloud environment, there are several options for where Policy Function 120 executes. As was the case in FIG. 1A, Policy Function 120 may execute in hardware that is distinct from Distributed Hardware 102 of the cloud environment. Or, if the cloud environment provider is only providing IaaS and the user entity is implementing and administering Message Broker 110 then Policy Function 120 could execute in the same compute engine (for example AWS EC2 instance) as Message Broker 110. Policy Function 120 can also execute in a different compute engine in the same cloud environment. In this case, the compute engine, and the administration of the Policy Function, could potentially be under the control of the cloud environment provider or any authorized user entity of the cloud environment. For example, the compute engine that Policy Function 120 executes in could be under the control of the user entity that is administering Message Broker 110, or under the control of a user entity utilizing the services of Message Broker 110, or possibly a user entity that is providing policy functions as a service to users of Message Broker 110.

Policy Function as FaaS

Several cloud environment providers now offer Function as a Service (FaaS) on their platforms. For instance, in AWS these are call Lambda functions and in Google they are called Cloud Functions. In environments that offer FaaS, Policy Function 120 can be implemented as a FaaS. Policy Function 120 can be implemented as a FaaS regardless of if Message Broker 110 is implemented in the same cloud environment but there are efficiency advantages when the policy functions and the message broker are in the same cloud environment. As with when Policy. Function 120 is executing in a compute engine, when Policy Function 120 is executing as a FaaS the FaaS can be under the control of the cloud environment provider or any authorized user entity of the cloud environment. For example, the FaaS that Policy Function 120 executes in could be under the control of the user entity that is administering Message Broker 110, or under the control of a user entity utilizing the services of Message Broker 110, or possibly a user entity that is providing policy functions as a service to user entities of Message Broker 110.

The use of FaaS for implementation of Policy Function 120 is distinct from the use of FaaS as message Consumer 132. A FaaS Policy Function 120 receives message information, optionally consumer information, and optionally message return information and is invoked to customize or offload a portion of the message processing of the message before it is delivered to message Consumer 132. While Policy Function 120 may add, delete, or modify message content, it is not a consumer of Message 170.

External Data with Cloud

As stated previously, the external data represented by External Data Repositories 122 can reside anywhere. This includes resources in a cloud environment.

Consumer End-Point

In a cloud environment, such as that depicted in FIG. 1B, it might be possible to utilize other services offered outside Message Broker 110 to act as a proxy message consumer interacting with Message Broker 110 and distribute the application Delivery Message 178 to the messaging system user entity. For example, Modified Message 176 may be a notification to which the messaging system user associated with message Consumer 132 is subscribed to receive via Short Message Service (SMS). The cloud environment may offer SMS as a service and Message Broker 110 might utilize one of the various messaging protocols to distribute Modified Message 176 to Consumer end-point 124 and then Consumer end-point 124 sends an SMS Message 178 to the messaging system user entity. A consumer end-point is a proxy message consumer in the messaging system that communicates with the message broker utilizing one or more protocols supported by the message broker to consume messages from a channel and then takes care of distributing the message information to a user entity of the messaging system, possibly using protocols and formats not supported by the message broker. Consumer end-point 124 is acting as the proxy for the messaging system user entity associated with message Consumer 132. Consumer end-point 124 connects to Message Broker 110 and initiates a Session 158 with Channel 112 and is subscribed to Channel 112. When Consumer end-point 124 receives Modified Message 176 over Session 158 it communicates the application Delivery Message 178 to the message system user associated with message Consumer 132 via the Consumer end-point connectivity with message system user 160 interface. Consumer end-point 124 is not necessarily an integral part of Message Broker HO but rather could just be a service Message Broker 110 utilizes. Consumer end-point 124 could be under the administrative control of the cloud environment provider as a service they offer, it could be under the control of a cloud environment user entity that also has administrative control of Message Broker 110, it could be under the control of any authorized user entity of the cloud environment, or it could be under the control of a user entity not related to the cloud environment at all. It could be a service offered by the cloud environment provider, implemented in a compute instance under the administrative control of the cloud environment provider or any authorized cloud environment user entity, implemented as a FaaS in the cloud environment under the administrative control of the cloud environment provider or any authorized cloud environment user entity, or in a computing environment distinct from the cloud environment hosting Message Broker 110. This is not intended to be an exhaustive list of locations to implement or administer Consumer end-point 124 and is not intended to be limiting to the invention.

In FIG. 1B message Consumer 132 may also subscribe to Channel 112 directly. Message Consumer 132 can set up a subscription to Channel 112 over Session 154 while having the delivery end-point be Consumer end-point 124. There are also other ways of establishing the subscription for Consumer 132 such as Application Administrator 134 sets up the subscription, the cloud environment provider provides a console or an API allowing Message Consumer 132, Application Administrator 134, or others to set up the subscription for Message Consumer 132.

Implementation

Message Broker 110, Policy Function 120, and Consumer end-point 124 are preferably implemented, in accordance with conventional techniques, as computer applications embodied in computer hardware and/or in computer software embodied in a non-transitory, computer-readable medium, and are hosted by one or more computers.

FIG. 2

Figure 2:
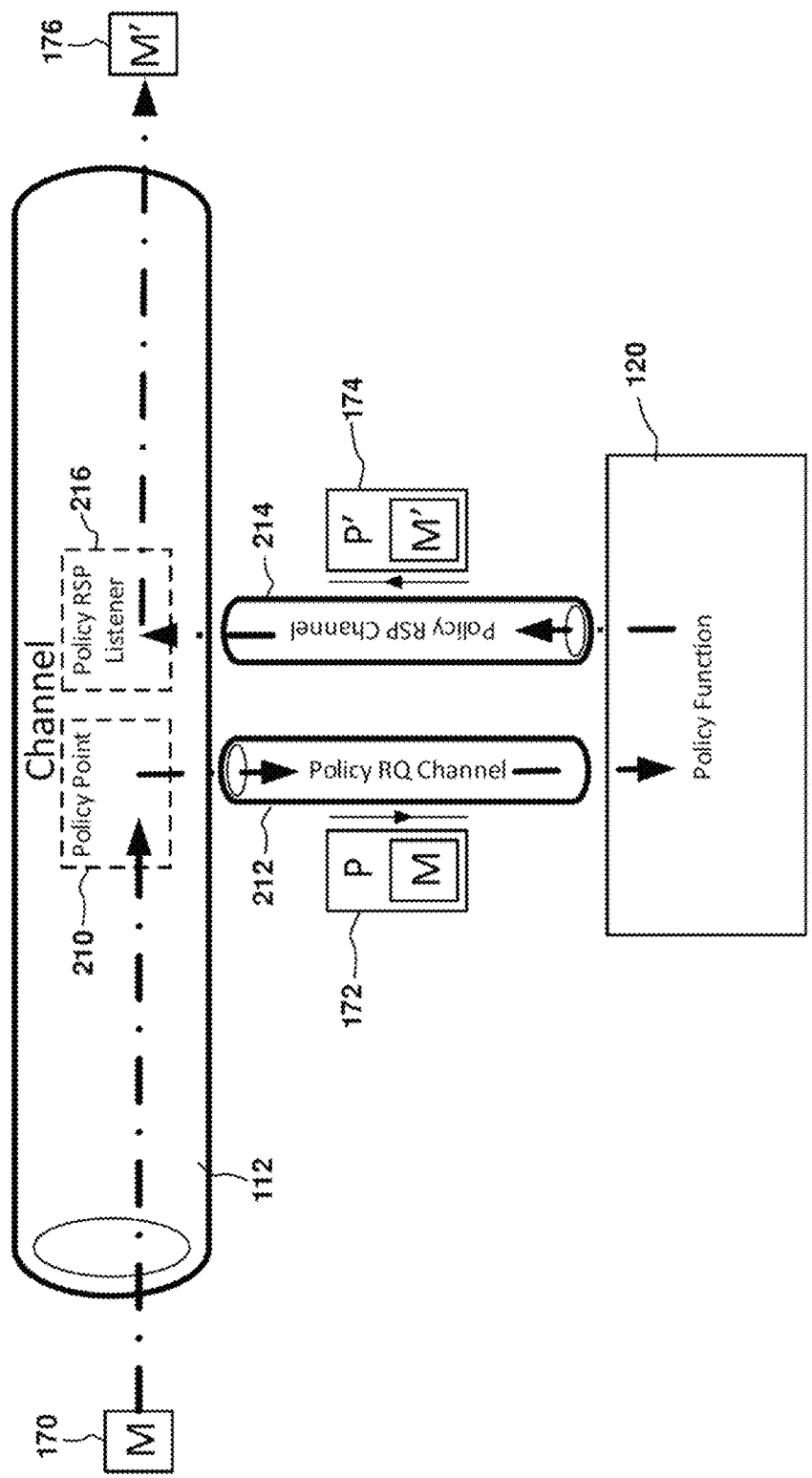
FIG. 2 schematically shows a simplified conceptual illustration of message processing in a channel at a policy point, constructed and operative in accordance with aspects of the present disclosure.

Reference is now made to FIG. 2, which is a simplified conceptual illustration of message processing in a channel at a policy point, constructed and operative in accordance with an embodiment of the invention.

Policy Point

Channel 112 receives Message 170 and reaches a point where Channel 112 supports the invocation of Policy Function 120. This point is referred to as a Policy Point 210. Channel 112 may have more than one Policy Point 210 where Channel 112 supports an authorized user entity configuring Channel 112 for the invocation of a policy function such as Policy Function 120. When Policy Point 210 is reached, if Channel 112 is configured to invoke a policy function at that point then Channel 112 invokes the configured Policy Function 120 using the configuration information. If Channel 112 is not configured to invoke a policy function at that policy point, Channel 112 continues normal processing of Message 170.

Examples of where Policy Points 210 might be placed in Channel 112 includes any point after Message 170 has been received but before information about consumers has been selected for Message 170, after information on potential consumers has been selected for Message 170, after information on a subset of potential consumers with a particular characteristic in common, such as the connector type, has been selected, or after information on a specific potential consumer has been selected. A connector type can be an indication of the protocol used for communicating with a producer or consumer such as MQTT, AMQP, HTTP, or HTTPS. Different Policy Points 210 in Channel 112 can be configured to invoke different Policy Functions 120 and to pass different parameters to Policy Function 120. These are exemplary placements of Policy Point 210 and are not intended to be an exhaustive list or limiting to the invention. Other placement of Policy Points 210 are possible.

Processing of Message 170 may follow multiple processing paths through Channel 112. For instance, processing of Message 170 may branch where a separate branch selects consumers that utilize one connector type for distribution of Message 170. Each of those branches may branch again for processing Message 170 for each consumer. Each branch may have its own set of Policy Points 210.

Policy Function Invocation

In various embodiments of the invention different options are available for the invocation of Policy Function 120. The choice of invocation method can be influenced by the environments in which Message Broker 110 and Policy Function 120 are executing and the requirements Message Broker 110 is fulfilling. Invocation methods can be categorized into synchronous invocation methods and asynchronous invocation methods. Policy Function 120 can be invoked synchronously or asynchronously.

When invoking Policy Function 120 synchronously the process in Message Broker 110 that invokes Policy Function 120 will block until a response is received. The design of Message Broker 110 will dictate if synchronous invocation of Policy Functions 120 is acceptable. A common way to invoke an external function synchronously is with Remote Procedure Call (RPC). Some of the cloud environment platforms also support synchronous calls for FaaS.

When invoking Policy Function 120 asynchronously the process in Message Broker 110 that invokes Policy Function 120 will not wait for a response but will continue processing after invoking Policy Function 120. Enqueueing Policy Function Message 172 can be considered to be calling Policy Function 120. Most implementations of Message Broker 110 will likely utilize asynchronous invocation of Policy Function 120, Exemplary ways of asynchronously invoking Policy Function 120 include but are not limited to local procedure call with callback, Application Programming Interface (API) calls to the function locally or remotely including REST (Representational State Transfer) APIs, messaging systems where Message Broker 110 and Policy Function 120 are user entities of the messaging system facilitating communication of the Policy Function invocation, and Function as a Service calls.

Message Queue Invocation of Policy Function

An exemplary asynchronous invocation of Policy Function 120 uses a message queue. The message queues used for Policy Function 120 invocation may be provided by the same Message Broker 110 that Channel 112 belongs to or may be provided by a different message broker. In this embodiment, one of the parameters the authorized user entity configuring Channel 112 for Policy Point 210 configures is the name of the queue to use for Policy Function 120 invocation depicted in FIG. 2 as Policy RQ Channel 212. Policy RQ Channel 212 can enqueue Policy Function Message 172 messages from more than one Policy Point 210 in Channel 112 or from more than one channel in Message Broker 110, or even from more than one message broker. In this embodiment, Channel 112 also has a Policy RSP Channel 214 associated with it that can be created at the same time Channel 112 is created and destroyed at the same time Channel 112 is destroyed. In one or more embodiments there is a separate Policy RSP Channel 214 for each Channel 112 calling policy functions. Channel 112 can be a queue or a topic. Channel 112 also has a Policy RSP Listener 216 for receiving Modified Policy Function Messages 174 from Policy RSP Channel 214. Policy RSP Listener 216 is a message consumer for the Policy RSP Channel 214. In one or more embodiments, Channel 112 has a single Policy RSP Channel 214 and Policy RSP Listener 216 for receiving Modified Policy Function Messages 174 although embodiments with multiple Policy RSP Channels 214 and Policy RSP Listeners 216 are within the scope of this invention. Policy RSP Listeners 216 can be a listener listening for pushed messages from Policy RSP Channel 214 or it could be a puller checking the channel and pulling messages.

When Message 170 reaches Policy Point 210, Channel 112 generates Policy Function Message 172 which includes information about Message 170 and information about Policy RSP Channel 214 and optionally other information, such as consumer information and security, tokens, and enqueues Policy Function Message 172 onto a Policy RQ Channel 212. At this point, Channel 112 is a message producer for Policy RQ Channel 212. Policy Function 120 receives Policy Function Message 172 from Policy RQ Channel 212, processes Policy Function Message 172, and optionally generates one or more Modified Policy Function Messages 174 and places it on the Policy RSP Channel 214 identified in Policy Function Message 172, There can be multiple instances of Policy Function 120 processing Policy Function Messages 172 from Policy RQ Channel 212.

When Policy RSP Listener 216 receives Modified Policy Function Message 174 from Policy RSP Channel 214, Channel 112 resumes processing of the message with the information from Modified Policy Function Message 174.

FaaS Invocation

In one or more embodiments of the invention, Policy Function 120 can be implemented using FaaS executing in a cloud environment. This is a particularly attractive implementation when Message Broker 110 is also executing in the same cloud environment. Several methods can be used to invoke, or trigger, a FaaS either from within the same cloud environment or remotely. A remote invocation of Policy Function 120 implemented as an AWS Lambda function (FaaS), for example, could include an Amazon API Gateway configured as a RESTful API to receive an HTTP encoded Policy Function Message 172 and invoke a Lambda function that implements Policy Function 120. The Lambda function would then process Policy Function Message 172. The remote Message Broker 110 can implement a RESTful API to allow the return of an HTTP encoded Modified Policy Function Message 174 from the Lambda function. Another option for the return Modified Policy Function Message 174 is a message channel for which the Lambda function can act as a message producer and Channel 112 can act as a message consumer.

In one or more embodiments of the invention when the cloud environment includes one or more messaging services and the cloud environment supports FaaS, the cloud environment's API for FaaS invocation allows Channel 112 at Policy Point 210 in the messaging service's Message Broker 110 to act as a trigger, or to invoke, a FaaS. The cloud environment includes methods to allow an authorized user entity to configure FaaS functions that can be used as Policy Function 120 in the environment and to configure channels in the message broker to trigger FaaS Policy Function 120 at particular Policy Points 210 in the Message Broker 110's Channel 112's processing of Message 170. FaaS Policy Function 120 is invoked with parameters equivalent to the information in Policy Function Message 172. The message broker can also include an API to allow the FaaS function to return the information equivalent to Modified Policy Function Message 174 to Channel 112 for continued processing. Another option for returning the Modified Policy Function Message 174 is a message channel for which the FaaS Policy Function 120 acts as a message producer and Channel 112 acts as a message consumer.

Any of the elements shown in FIG. 2 are preferably implemented in computer hardware and/or in computer software embodied in a non-transitory, computer-readable medium in accordance with conventional techniques, such as where Channel 112 and Policy Function 120 are a part of a Distributed Hardware 102 cloud environment as depicted in FIG. 1B.

FIG. 3

Figure 3:
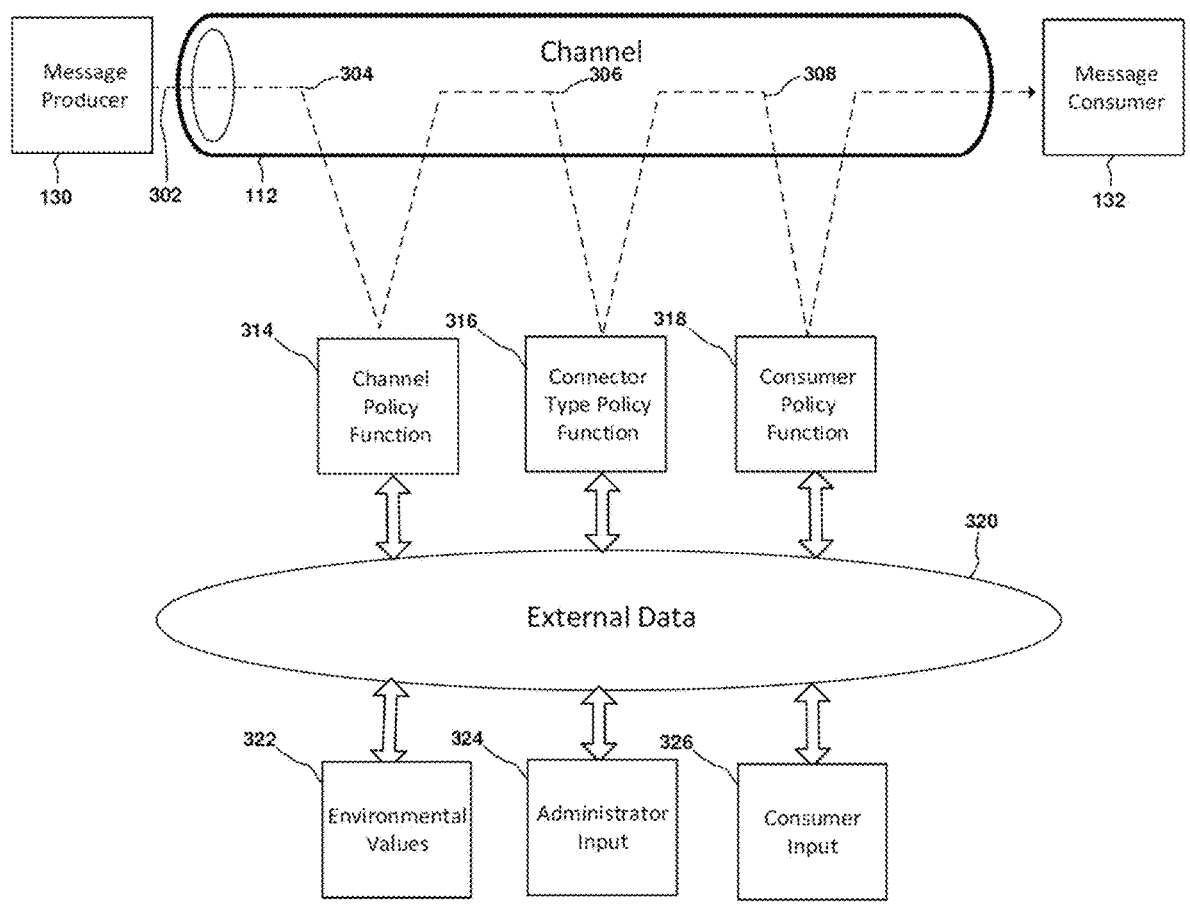
FIG. 3 schematically shows a simplified conceptual illustration of message processing in a channel further illustrating multiple policy functions being invoked, constructed and operative in accordance with aspects of the present disclosure.

Reference is now made to FIG. 3, which is a simplified conceptual illustration of message processing in a channel further illustrating multiple policy Functions being invoked, constructed and operative in accordance with one or more embodiments of the invention.

Multiple Policy Functions

An example is depicted in FIG. 3 of the processing path of a message enqueued into Channel 112 by message Producer 130. For this example, Channel 112 is a topic and message Producer 130 publishes a message to the topic represented by Channel 112. Channel 112 processes the message following Message Processing Path 302. As Channel 112 is processing the message the processing encounters a policy point before any consumer information has been associated with the message. The policy point is referred to here as a Channel Policy Point 304. Channel 112 is configured to invoke Channel Policy Function 314 at Channel Policy Point 304. Channel Policy Point 304 is invoked before any branches in the message processing path and changes made by Channel Policy Function 314 can affect all recipients of the message.

After Channel Policy Function 314 returns the modified message to Channel 112 for continued processing along Message Processing Path 302 consumer information is associated with the message. In this example, at this point the consumers are sorted by the type of protocol to be used for the end-point for the consumer and Message Processing Path 302 splits with one branch for each type of protocol. Each branch of Message Processing Path 302 then encounters a policy point for when information for one or more consumers with homogeneous distribution policy type is associated with a message. The policy point is referred to here as a Connector Type Policy Point 306. Channel 112 is configured to invoke Connector Type Policy Function 316 at Connector Type Policy Point 306. Since Connector Type Policy Function 316 is invoked with information about consumers with homogeneous distribution protocols, Connector Type Policy Function 316 can establish a policy for the distribution protocol for the consumers with consumer information associated with the message when the Connector Type Policy Function 316 is invoked.

After Connector Type Policy Function 316 returns the modified message to Channel 112 for continued processing along Message Processing Path 302, Message Processing Path 302 splits again with one branch for each consumer. Each branch of Message Processing Path 302 then encounters a policy point for when information for one consumer is associated with a message. The policy point is referred to here as a Consumer Policy Point 308, Channel 112 is configured to invoke Consumer Policy Function 318 at Consumer Policy Point 308. Since Consumer Policy Function 318 is invoked with information about a single consumer, Consumer Policy Function 318 only affects the message for the consumer with consumer information associated with the message when Consumer Policy Function 318 is invoked.

Examples of possible placement of Policy Points include: when a message is received by the messaging system for a channel and is being enqueued (message is being placed in the queue or published to a topic); when a message is being dequeued from a publish/subscribe system; when a message is being reserved from a queue by a consumer (a consumer is processing the message from the queue and will delete it from the queue when it completes processing); when a message is being dequeued/deleted from a queue; and when a reserved message has timed out and is being made available again. A typical pattern for a message consumer to "pull" a message from a queue is for the consumer to: 1) reserve a message in the queue providing it exclusive rights to process the message; 2) process the message; and 3) delete the message from the queue. If the consumer does not delete the message from the queue within a determined timeout the message is returned to availability for other consumers to "pull" the message from the queue. Policy Functions can be utilized to control the selection of messages to be reserved for a consumer pull request.

External Data

Policy Functions 314, 316, and 318, can access and utilize External Data 320 during their execution. Any information the policy functions can access can be sources of External Data 320. Exemplary sources of External Data 320 include Environmental Values 322 such as temperature of a server or server room or the current time, Administrator Input 324 data that an application administrator might control to affect the message processing, or Consumer Input 326 that consumers can make available to affect message processing.

Any of the elements shown in FIG. 3 are preferably implemented in computer hardware and/or in computer software embodied in a non-transitory, computer-readable medium in accordance with conventional techniques, such as where Channel 112 is a part of a Message Broker 110 hosted by Message Broker Hardware 100 or Distributed Hardware 102 cloud environment as depicted in FIG. 1A or FIG. 1B.

FIG. 4A

Figure 4A:
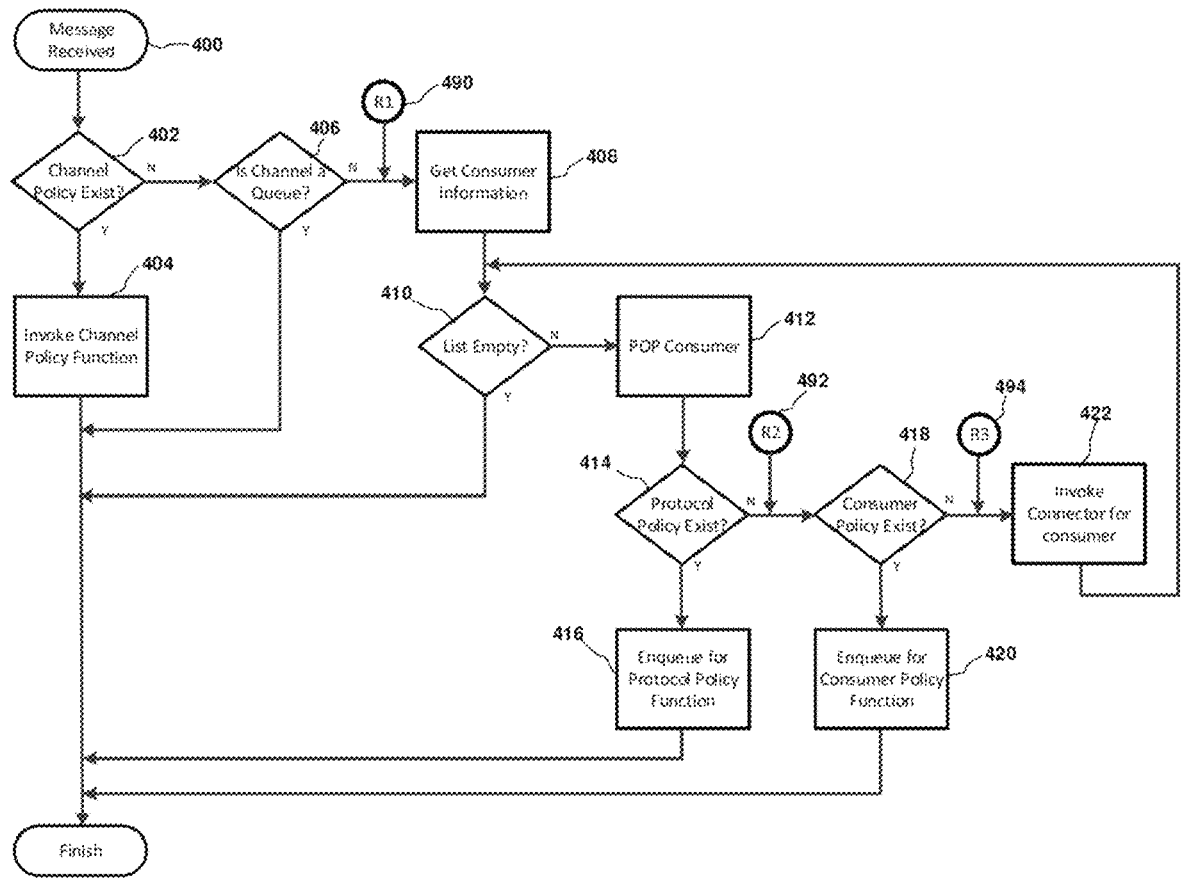
FIG. 4A schematically shows a simplified flowchart illustration of an exemplary method of operation of the system of FIG. 1A through FIG. 3 related to receiving a message from a message producer, operative in accordance with aspects of the present disclosure.

Reference is now made to FIG. 4A which is a simplified flowchart illustration of an exemplary method of operation of the system of FIG. 1A through FIG. 3 related to receiving a message from a message producer, operative in accordance with an embodiment of the invention. This method is exemplary and does not limit the invention to this method alone. In this example policy points are available for an authorized user entity to configure at a point before consumer information is associated with the message, at a point after a consumer is associated with the message based on the protocol type configured for distribution to the consumer, and after consumer information has been associated with the message based on the consumer.

Message Received

In the method of FIG. 4A, a message from a message producer is received at a first computer-hosted software application, such as at a message broker in a data messaging system, and is associated with a message channel on the message broker (step 400). The computer-hosted software application allows authorized user entities to configure the message processing to invoke user defined policy functions to perform part of the processing of messages. There can be more than one point in the message processing path where the computer-hosted software application invokes user defined policy functions.

Channel Policy Function

The method determines if the invocation of a user defined policy function for all messages received on the channel with which the received message is associated has been configured (step 402). If yes (Y), the method invokes the configured channel policy function (step 404). This invocation includes information about the message as well as other optional information. If the invocation is asynchronous the optional information can include information about a callback function for continued processing when the response is received from the channel policy function or the identifier of a queue to use for returning the response.

For asynchronous invocations of the channel policy function the method of FIG. 4A completes after invoking the channel policy function. The method of FIG. 4B directs the response from the channel policy function back into the method of FIG. 4A when a response is received. For synchronous invocations of the channel policy function, if the channel is a queue then the method of FIG. 4A is complete after the channel policy function returns a response and the processing of the message continues according to the existing art. If the channel is a topic then after the synchronous invocation of the channel policy function returns the method continues at point R1 (connector 490).

Associating Consumer Information

If in step 402 a determination is made that a channel policy has not been configured for the channel with which the channel is associated (N), or a channel policy function was called synchronously and has returned, then a determination is made if the channel is a queue (step 406), If the channel is a queue (Y) then the method of FIG. 4A is complete and the processing of the message continues according to the existing art. If the channel is a topic (N) or the method of FIG. 4B feeds back into the method of FIG. 4A at entry R1 (connector 490) then the method continues with retrieving consumer information for subscribers to the topic (step 408). In this example, information about zero or more subscribers is place into a list of potential consumers.

Once the list is generated, the method determines if the list is empty or if it has elements of consumer information (step 410). If the list of consumer information is empty (Y)

then the method of FIG. 4A is complete and the processing of the message continues according to the existing art.

If the list of consumer information is not empty (N) then an element of consumer information is popped from the list (step 412). In this exemplary embodiment of the invention information for each potential consumer is processed separately. Each combination of a message and a consumer message/consumer combination) generates a separate invocation of a policy, function. However, additional embodiments of the invention could group the consumer information by various criteria, such as distribution protocol to be used with the consumer, and could then process information for groups of consumers at the same time, possibly creating a new branch for processing the message with each group of consumers. As well, rather than popping consumer information off the list and sequentially processing each element of consumer information, a branch could be created for each element and all the branches could run in parallel.

Protocol Policy Function

After an element of consumer information has been popped off the list, the method determines if the invocation of a user defined policy function for the delivery protocol specified for the consumer has been configured (step 414). If yes (Y), the method invokes the configured protocol policy function (step 416). This invocation includes information about the message, information about the consumer, and other optional information. If the invocation is asynchronous the optional information can include information about a callback function for continued processing when the response is received from the protocol policy function or the identifier of a queue to use for returning the response.

For asynchronous invocations of the protocol policy function, the method of FIG. 4A completes after invoking the protocol policy function. The method of FIG. 4B directs the response from the protocol policy function back into the method of FIG. 4A when a response is received. For synchronous invocations of the protocol policy function, after the synchronous invocation of the protocol policy function returns the method continues at point R2 (connector 492).

Consumer Policy Function

Figures 4B, 4C:
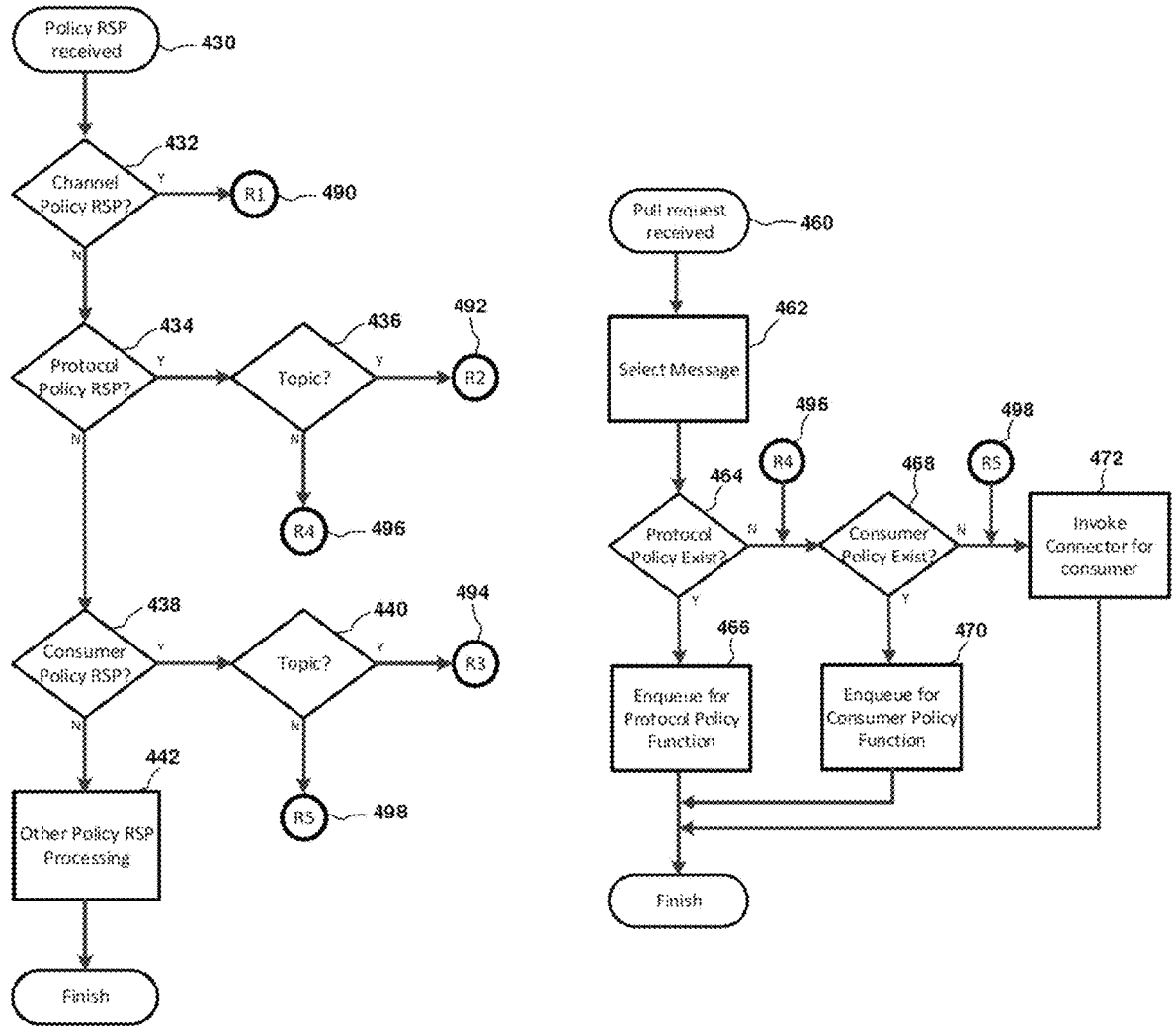
FIG. 4B schematically shows a simplified flowchart illustration of an exemplary method of operation of the system of FIG. 1A through FIG. 3 related to receiving a response from a policy function, operative in accordance with aspects of the present disclosure.
FIG. 4C schematically shows a simplified flowchart illustration of an exemplary, method of operation of the system of FIG. 1A through FIG. 3 related to receiving a pull request from a message consumer, operative in accordance with aspects of the present disclosure.

If in step 414 a determination is made that a protocol policy has not been configured for the channel for the protocol type configured for the consumer subscription, or a protocol policy function was called synchronously and has returned, or the method of FIG. 4B feeds back into the method of FIG. 4A at entry R2 (connector 492), the method determines if the invocation of a user defined policy function for consumers has been configured (step 418). If yes (Y), the method invokes the configured consumer policy function (step 420). This invocation includes information about the message, information about the consumer, and other optional information. If the invocation is asynchronous the optional information can include information about a callback function for continued processing when the response is received from the protocol policy function or the identifier of a queue to use for returning the response.

For asynchronous invocations of the consumer policy function the method of FIG. 4A completes after invoking the consumer policy function. The method of FIG. 4B directs the response from the consumer policy function back into the method of FIG. 4A when a response is received. For synchronous invocations of the consumer policy function, after the synchronous invocation of the consumer policy function returns the method continues at point R3 (connector 494).

Continued Processing

If in step 418 a determination is made that a consumer policy has not been configured for the channel for the consumer subscription, or the consumer policy function was called synchronously and has returned, or the method of FIG. 4B feeds back into the method of FIG. 4A at entry R3 (connector 494), processing of the message continues according to prior art methods. In this example the next step is to invoke the appropriate connection (processing module) to deliver the message to the consumer (step 422). After this, if the consumer information is being processed sequentially, the method returns to step 410 to determine if the list of consumer information is now empty. Alternate embodiments may create a separate branch for each consumer in which case the method is now complete for this message.

Connectors

For asynchronous processing, entry points are provided into the method for responses for invoked policy functions. The method depicted in FIG. 4B directs the response to the appropriate entry point. In FIG. 4A, entry point R1 (connector 490) is the entry point for responses from an invoked channel policy function. Entry point R2 (connector 492) is the entry point for responses from an invoked protocol policy function. Entry point R3 (connector 494) is the entry point for responses from an invoked consumer policy function.

FIG. 4B

Reference is now made to FIG. 4B which is a simplified flowchart illustration of an exemplary method of operation of the system of FIG. 1A through FIG. 3 related to receiving a response from a policy function, operative in accordance with one or more embodiments of the invention. This method is exemplary and does not limit the invention to this method alone. This example works in conjunction with the method depicted in FIG. 4A with the same policy points in the message processing.

Policy RSP Received

In the method of FIG. 4B, a response from an asynchronously invoked policy, function is received at a first computer-hosted software application, such as at a message broker in a data messaging system (step 430), The computer-hosted software application examines the response and determines the channel for which the response is destined and the type of response. In this example the response could be from a channel policy function, a protocol policy function, or a consumer policy function.

The method determines if the response is from a channel policy (step 432). If it is (Y) the method passes the response to the method of FIG. 4A at entry point R1 (connector 490).

If the response is not from a channel policy function (N) the method determines if the response is from a protocol policy function (step 434). If it is (Y) the method determines if the destination channel for the response is for a topic or a queue (step 436). If it is for a topic (Y) the method passes the response to the method of FIG. 4A at entry point R2 (connector 492). If it is for a queue (N) the method passes the response to the method of FIG. 4C at entry point R4 (connector 496).

If the response is not from a protocol policy function (N) the method determines if the response is from a consumer policy function (step 438). If it is (Y) the method determines if the destination channel for the response is for a topic or a queue (step 440). If it is for a topic (Y) the method passes the response to the method of FIG. 4B at entry point R3 (connector 494). If it is for a queue (N) the method passes the response to the method of FIG. 4C at entry point R5 (connector 498).

If the response was not one of the expected response types some other processing such as error logging can be performed (step 442).

FIG. 4C

Reference is now made to FIG. 4C which is a simplified flowchart illustration of an exemplary method of operation of the system of FIG. 1A through FIG. 3 related to receiving a pull request from a message consumer, operative in accordance with an embodiment of the invention. In this example a message consumer is attempting to pull a message from a queue. This method is exemplary and does not limit the invention to this method alone. This example works in conjunction with the method depicted in FIG. 4A with the same policy points in the message processing.

Pull Request Received

In the method of FIG. 4C, a request from a message consumer requesting a message from a queue be reserved for the message consumer is received at a first computer-hosted software application, such as a message broker in a data messaging system (step 460). The request from the message consumer includes information identifying the queue from which the consumer wants a message pulled, optionally additional message selection criteria, and consumer information which includes the protocol to use and the end-point for forwarding the message.

The method selects a message for reserving for the message consumer that sent the request (step 462).

Protocol Policy Function

Once the message information is associated with the consumer information of the requester the method determines if the invocation of a user defined policy function for the deliver protocol specified for the consumer has been configured (step 464). If yes (Y), the method invokes the configured protocol policy function (step 466). This invocation includes information about the message, information about the consumer, and other optional information. If the invocation is asynchronous the optional information can include information about a callback function for continued processing when the response is received from the protocol policy function or the identifier of a queue to use for returning the response.

For asynchronous invocations of the protocol policy function the method of FIG. 4C completes after invoking the protocol policy function. The method of FIG. 4B directs the response from the protocol policy function back into the method of FIG. 4C when a response from the protocol policy function is received. For synchronous invocations of the protocol policy function, after the synchronous invocation of the protocol policy function returns, the method continues at entry point R4 (connector 496).

Consumer Policy Function

If in step 464 a determination is made that a protocol policy has not been configured for the channel for the protocol type configured in the consumer information, or a protocol policy function was called synchronously and has returned, or the method of FIG. 4B feeds back into the method of FIG. 4C at entry R4 (connector 496), the method determines if the invocation of a user defined policy function for the consumer has been configured (step 468). If yes (Y), the method invokes the configured consumer policy function (step 470). This invocation includes information about the message, information about the consumer, and other optional information.

If the invocation is asynchronous the optional information can include information about a callback function for continued processing when the response is received from the protocol policy function or the identifier of a queue to use for returning the response.

For asynchronous invocations of the consumer policy function the method of FIG. 4C completes after invoking the consumer policy function. The method of FIG. 4B directs the response from the consumer policy function back into the method of FIG. 4C when a response is received. For synchronous invocations of the consumer policy function, after the synchronous invocation of the consumer policy function returns, the method continues at entry point R5 (connector 498).

Continued Processing

If in step 468 a determination is made that a consumer policy has not been configured for the channel for the consumer, or the consumer policy function was called synchronously and has returned, or the method of FIG. 4B feeds back into the method of FIG. 4C at entry R5 (connector 498), processing of the message continues according to prior art methods. In this example the next step is to invoke the appropriate module to reserve the message for the consumer and communicate the message to the consumer for processing (step 472).

Connectors

For asynchronous processing, entry points are provided into the methods for responses from invoked policy functions. The method depicted in FIG. 4B directs the response to the appropriate entry point. In FIG. 4C, entry point R4 (connector 496) is the entry point for responses from an invoked protocol policy function and entry point R5 (connector 498) is the entry point for responses from an invoked consumer policy function.

FIG. 5

Figure 5:
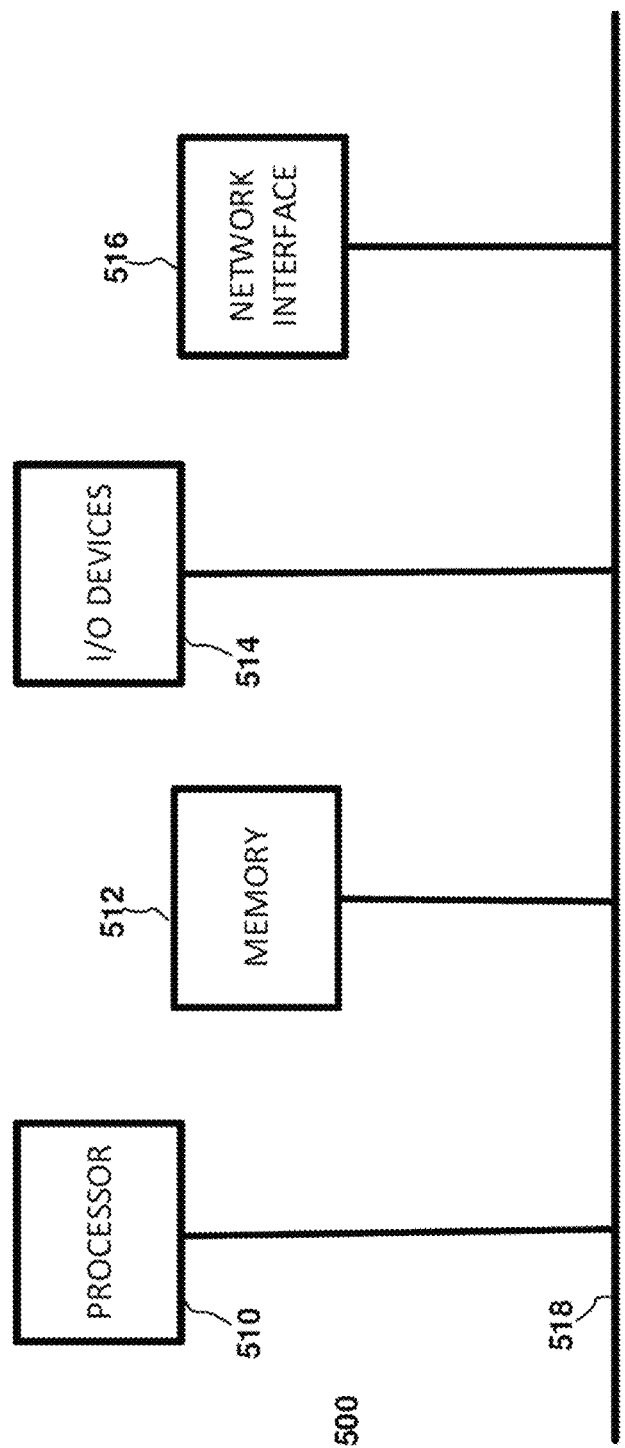
FIG. 5 schematically shows a simplified block diagram illustration of an exemplary hardware implementation of a computing system, constructed and operative in accordance with aspects of the present disclosure.

Referring now to FIG. 5, which is a simplified block diagram illustration of an exemplary hardware implementation of a computing system, constructed and operative in accordance with an embodiment of the invention. Block diagram 500 illustrates an exemplary hardware implementation of a computing system in accordance with one or more components/methodologies of the invention (e.g., components/methodologies described in the context of FIGS. 1A-4C) which may be implemented, according to an embodiment of the invention. This can also be referred to as the computer hardware.

As shown, the techniques for messaging between distributed systems and for user defined policy functions may be implemented in accordance with one or more processors 510, one or more memories 512, I/O devices 514, and one or more network interfaces 516, coupled via one or more computer buses 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

EXAMPLES

Operation of the systems of FIGS. 1A through 3 the methods of FIGS. 4A through 4C may be further appreciated in the context of the examples.

Figure 6:
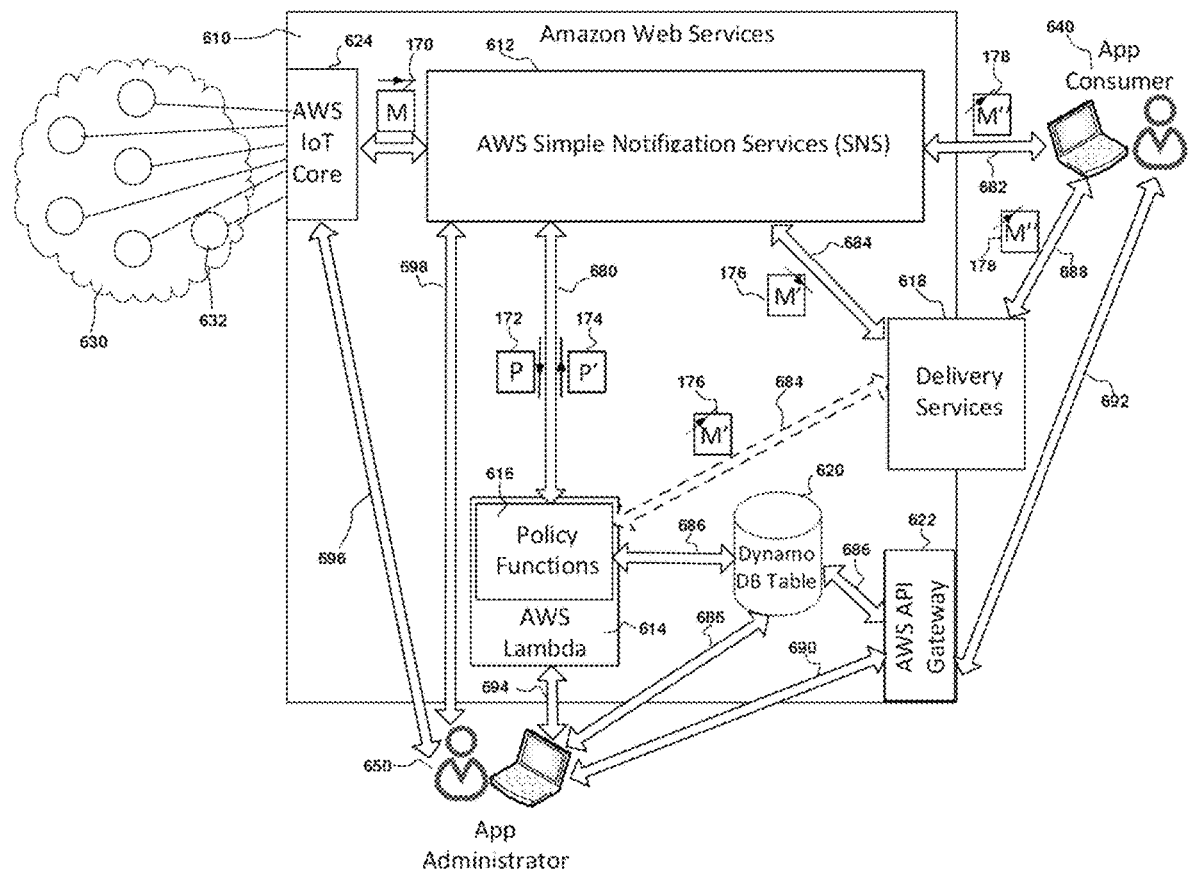
FIG. 6 schematically shows a simplified block diagram illustration of an exemplary implementation based on Amazon Web Services, constructed and operative in accordance with aspects of the present disclosure.

FIG. 6—Seizure Monitoring Application

Referring now to FIG. 6, which is a simplified block diagram illustration of an exemplary implementation based on Amazon Web Services, constructed and operative in accordance with an embodiment of the invention.

In the example of FIG. 6 an application provides notifications about seizures. Individuals to be monitored for seizures ware an apparatus that monitors various characteristics of the individual; such as limb movement and rotation, electrodermal activity, and peripheral skin temperature, to detect a likely seizure. The apparatus also monitors the individual's location. If the apparatus detects a likely seizure it sends an alert notifying caregivers, that have subscribed to the application for the individual, of the likely seizure. The application also includes the location of the individual and an indication identifying the subscriber that is the closest to the individual in the notifications. It is possible to also include additional information in the notification, but for this example we focus on indicating who is the closest subscriber.

This exemplary application depends upon the services of an improved version of AWS Simple Notification Service (SNS) that has been modified to implement the invention. Current versions of AWS SNS do not include these modifications and this example is intended to highlight some of the advantages that would be gained by implementing the invention in AWS SNS.

This exemplary system has a cloud of Internet of Things (TOT) 630 with an individual that is being monitored waring a thing 632, uses Amazon Web Services (AWS 610) for the application backend services, has one or more Application Administrators 650, and one or more Application Subscribers 640. When thing 632 detects an individual having a seizure, it sends an alert. The alert is received by the AWS 610 backend which processes the alert and sends a notification to one or more Application Subscribers 640. Application Administrator 650 takes actions to maintain the application.

IoT Thing

For this example, the apparatus the individual is waring is an Internet of Things (IoT) thing 632 able to connect to the Internet, directly or indirectly, over a wireless connection.

Exemplary wireless connectivity includes a cellular connection built into thing 632 to communicate with an aggregation point, a WiFi connection to a device that is connected to the Internet that can forward messages on to an aggregation point, or a piconet of wireless (Bluetooth) devices, one or more of which are able to forward alerts to an aggregation point, such as thing 632 using Bluetooth to communicate with the individual's smart phone which then forwards any alerts on to the focal point though a WiFi or cellular connection.

Amazon Web Services (AWS)

This exemplary application utilizes Amazon Web Services (AWS 610) for the application backend. Several different services are utilized including AWS IoT Core 624 as the aggregation point for cloud of IoT things 630, AWS' Function as a Service (FaaS) Lambda 614 for running Policy Functions 616, Dynamo DB Tables 620 for storing external data, various Delivery Services 618, some of which are a part of AWS 610 and some of which are external to AWS 610, AWS API Gateway 622 providing a RESTful interface for allowing the application (user entities and/or administrators) an interface for viewing, adding, deleting, or modifying external data stored in Dynamo DB Tables 620, and Amazon Simple Notification Service (SNS 612) as the message broker providing the topic to which Application Subscribers 640 subscribe and the delivery service for Short Message Service (SMS) delivery of notifications.

AWS IoT Core 624 includes an embedded MQTT broker hosting the topic to which thing 632 publishes alerts. AWS IoT Core 624 publishes Message 170 containing the information from the alert to an AWS Simple Notification Service (SNS) 612 topic used to notify Application Subscribers 640 about the alert. AWS SNS 612 processes Message 170 and reaches a point where an authorized user entity, such as Application Administrator 650, has configured SNS 612 to invoke Policy Function 616, which is an AWS Lambda 614 function, and passes the function a Policy Function Message 172 which includes information about the alert contained in Message 170 and about the consumers (Application Subscribers 640 subscribed to the SNS 612 topic).

Policy Function 616 processing the information about the alert, including the location of the individual having the seizure, the consumers, and external data stored in Dynamo DB Table 620 (which includes the current location of Application Subscribers 640). Using this information, Policy Function 616 calculates the closes Application Subscriber 640 to the individual and inserts the information about who is the closest Subscriber into Modified Policy Function Message 174.

AWS SNS 612 is also modified to include an API allowing for the return of Modified Policy Function Message 174 for the continued processing by the topic. Policy Function 616 calls this API and passes Modified Policy Function Message 174 to AWS SNS 612 and AWS SNS passes Modified Policy Function Message 174 to the delivery method specified by the consumer (subscriber) information for each Application Subscriber 640.

In our exemplary application the possible methods for delivery of the notification includes Short Message Service (SMS), email, and push notification to an application running on Application Subscriber 640's device. For SMS delivery, AWS SNS 612 provides the formatting and delivery service for delivering Delivery Message 178 to Application Subscriber 640. For email delivery, AWS SNS 612 sends the information to a delivery service 618, such as Amazon Simple Email Service (SES), for delivery of Delivery Message 178 to Application Subscriber 640. In the case of push notifications, a number of different delivery services 618 could be called depending on the device to which the notification is being pushed. For example, AWS SNS 612, might send the notification to Amazon Device Messaging (ADM), or Apple Push Notification Service (APNS), or Google Cloud Messaging (GCM). The push notification service would then deliver the notification to the appropriate Application Subscribers 640 for the service.

An additional embodiment of the invention, included as an option in this example, allows Policy Function 616 to forward the Modified Message 176 information for one or more of the consumers (subscribers) directly to the delivery service 618 for that subscriber and remove the subscriber from the list of consumers returned in Modified Policy Function Message 174. If the Modified Message 176 information is forwarded to a delivery service 618 for all consumers identified in Policy Function Message 172, Policy Function 616, may not even call the return interface to AWS SNS 612 for continued processing.

Application Administration and Data Management

Authorized user entities such as Application Administrator 650 set up the AWS services to provide the backend functionality for the seizure monitoring application. The AWS IoT Core 624 is configured to be the IoT message broker for IoT things 632, Policy Function 616 is loaded into AWS Lambda 614 where it is then available to be invoked and one or more topics are created in AWS SNS 612 for use by the application including configuring the policy points to invoke policy function 616. This is an example where the message broker (AWS SNS 612) is managed by Amazon but the message service user entity, represented by the application and the Application Administrators 650, manages the Policy Function 616 Lambda functions. The Application Administrators 650 also create and manage the Dynamo DB Tables 620 that maintain some of the external data and the AWS API Gateway 622 that allows web-based access to view, add, delete, and modify the external data maintained in the Dynamo DB Tables 620.

Alternatively, the initial configuration of the AWS 610 services can be orchestrated by a Cloud Formation template that automates the building of the backend services. Authorized user entities, such as Application Administrator 650, build, maintain, and invoke the cloud formation templates that build the backend services for the application.

Interfaces

The AWS SNS to Policy Function interface 680 for AWS SNS 612 invoking Policy Function 616 is a modification of AWS 610 to allow a Lambda 614 function to be triggered at a policy point in AWS SNS 612. The interface for returning the information from Policy Function 616 back to AWS SNS 612 for continued processing is a new SNS API called from Policy Function 616. The AWS SNS Access interfaces 698 are modified to allow authorized user entities to configure the policy points in topics to invoke Policy Functions 616.

Authorized user entities, such as Application Administrator 650, utilize existing interfaces for Managing and utilizing AWS services. The existing interfaces for the different AWS services, such as consoles or APIs, for the most part require little if any modification to support the invention and this example. Interfaces that require little or no modification include the authorized user entity to AWS IoT Core interfaces 696, the authorized user entity to AWS Lambda interfaces 694, the authorized user entity to Dynamo DB interfaces 686, and the authorized user entity to AWS API Gateway Management interfaces 690. The authorized user entity to AWS SNS interfaces 680 does require some modification to support the configuration of policy points and the invocation of Policy Functions.

The Delivery Services 618 that AWS SNS 612 calls for the delivery of some notifications to Application Subscribers 640 have existing interfaces 684 that should not require any significant changes to support the invention and this example and in the alternate example where Policy Function 616 forwards one or more notifications directly to a Delivery Service 618 the same interface 684 is used. As well, AWS SNS 612 utilizes a standard protocol and interface 682 for delivering SMS notifications to Application Subscribers 640 and the Delivery Services 618 all have established interfaces 688 for communicating notifications to Application Subscribers 640.

Dynamo DB has existing interfaces 686 for managing and accessing Dynamo DB Tables 620 and the information in the tables. No changes are needed to these interfaces 686. AWS API Gateway 622 has existing interfaces for allowing authorized user entities to access the exposed APIs from the Internet using web interfaces 692. These interfaces require minimal if any change to support this invention and this example.

ADDITIONAL EXAMPLES

Amazon SNS Filter Policy Replacement

The Amazon SNS service does provide an option for subscribers to filter messages published to a topic. This is accomplished by attaching a filter policy to a subscription. A filter policy is a JSON object specifying attributes to match against the message attributes. This filter policy must be created and attached to each subscription, is limited to filtering on message attributes, and is a limited resource (there is a soft limit in SNS of 200 filter policies per AWS account per region). Also, Amazon doesn't currently break out charges for the computation costs of message filtering leaving the costs bundled in with the per message charges.

Policy Functions can be used as an improved and more flexible alternative to JSON filter policies. One option would be for a topic owner (a SNS user entity with authorization for managing the topic) to configure a policy function in Lambda to be invoked once consumer information is associated with the message. Consumer information or a reference to the consumer information for one or more consumers is passed to the Policy Function along with the message or a reference to the message. Also, if a limit is set on the maximum number of consumers for which consumer information is to be passed into the policy function, more than one instance of the policy function can be concurrently invoked for the message. This effectively eliminates any limits on the number of consumers that can use message filtering. Some of the filter information for consumers can be stored in a database and be referenced by the policy function. The policy function can determine to which consumers the message is of interest and to which consumers the message is not of interest and pass that back to the topic for continued processing and for delivery of the message to interested consumers. This allows subscriptions to be managed by the topic, filter criteria to be managed by a database, and filtering to be handled by compute resources. Each aspect of the process is managed by the resource best suited for the task. As well, the filtering can be performed based on additional criteria other than the message attributes and message headers as is illustrated in other examples. Another option is for the authorized subscriber to a topic configuring a policy function associated with their subscription and that policy function being called before a message is pushed to the consumer. This allows the consumer to have complete control of the message filtering for messages to be sent to them. As such, this allows the consumer to provide the resources for the filtering.

Another benefit of running the policy function in Lambda and storing the filter data in a database such as Dynamo DB is that the SNS user entities that consume resources for filtering can be charged for their consumption rather than spreading the cost out across all user entities of the SNS messaging system. In this example the topic owner's account would be charged for the resources utilized for filtering. However, it would also be possible, with the right authorizations put in place and the consumers are also AWS customers, to specify a policy function for each consumer and for the policy function to run under the consumers AWS account and access a database associated with their account and the consumer's account being billed for the consumed resources for filtering.

Relevance Filtering

In an additional example, a policy function is set up to provide improved message filtering on a topic based on current relevance to the consumer's expressed interest. The consumer is following a specified baseball team using a topic-based application and wishes to receive notifications that are relevant to the specified baseball team's standings at the time. For this example, the consumer can specify relevant notifications as updates on their team and any, team ahead of them in their division or ahead of them in the wildcard race. What notifications are relevant will change based on the team the consumer is following and the standings of all the teams in their division and league. The application administrator creates a topic on a message broker for receiving notifications about teams for the sport. They configure a policy point on the topic and specify a policy function to be invoked once consumer information is associated with the notification.

A client front-end application takes care of subscribing the consumer to the topic and stores user selected options in a database accessible to the policy function set up by the administrator. For instance, the user can select their team to follow and specify which of the following they want notifications about: teams ahead of or tied with them in the division, teams ahead of or tied with them in the wildcard race, teams within a specified number of games behind them in either the division or wildcard race, or the next team their team will be facing.

The relevance of a notification will change depending on the team the user selected, the options the user selected, and the current standings.

When the policy function receives a message with consumer information associated with it, for each consumer associated with the message, the policy function has access to the consumer information associated with the policy message, can retrieve the information about each consumer's options selections from the database, and can access the current baseball standings. Using this information, the policy function can determine for which consumers the notification is relevant and only return consumer information for those consumers.

Additional Customized Consumption

Policy functions can utilize any number of criteria for filtering decisions. For instance, a consumer may have specified temporal constraints for when they are willing to receive notifications. If the current time is not within the constraints they have specified, the message is dropped from their subscription. Or a consumer may specify a blacklist of publishers from which they don't want to receive messages or even limit reception to publishers with a specified quality rating such as a set number of stars or better rating. Or a consumer may filter their notifications based on the status of their calendar; i.e. no messages if their calendar indicates they are busy. The policy function may filter what consumers receive the message based off what other consumers are subscribed to the message. A policy function may filter messages based off a consumer's geographical location, for instance, only consumers within a certain distance of one of a company's stores will receive the message. A policy function may filter messages based on the CPU utilization of the consumer, for instance if a consumer's utilization is over 90% the message isn't delivered to them. The list of possibilities is practically endless.

However, policy functions can do more than just filter messages. For example, policy functions can add, delete, or modify message body content, add, delete or modify message attributes, add, delete, or modify message headers, or add, delete, or modify consumers and consumer attributes. In FIG. 6 additional message content was inserted into the message (which subscriber was closest to the monitored individual).

Amazon SNS Delivery Policy Replacement

The Amazon SNS service provides support for HTTP/HTTPS endpoints and sometimes it takes more than one attempt to deliver a message. AWS provides a mechanism for customizing the parameters for retrying delivery to an HTTP/HTTPS endpoint called a Delivery Policy. Delivery Policies can be defined for a topic or for a subscription. Using policy functions, a Dynamo DB table can maintain information for the delivery retry policy for the topic and for each HTTP/HTTPS endpoints that want to override the default policy. When a policy function is called with associated consumer information, the information for the consumer's specific delivery retry policy can be modified or added to the consumer information for that consumer. This can be referred to as a delivery policy function, Modification of Consumer Endpoint In an additional example, the delivery endpoint is modified based on external criteria. A consumer wants to receive a message via a push to their smart-phone when their phone is powered on and on the network, but if their device is not on the network they want to receive the message via email. They don't want to receive the same message both through a push and email. A database maintains the status of their device on the network and their configuration options. A policy function invoked after consumer information is associated with the message checks the status of a consumer's device and if the device isn't connected the delivery endpoint is modified from a push to the consumer's smart-phone to an email to the consumer. This demonstrates modification of both the endpoint and the protocol to be used for delivery. Another extension to this example is where the consumer has an interface that allows them to "mute" push notifications and cause them to be redirected to someplace else (like their email).

Message Customization

In an additional example, information about the consumers is maintained in a database. When a policy function with associated consumer information is invoked the policy function can access the database and customize the message for each consumer, Examples for how to accomplish this include invoking the policy function for each consumer of the message and invoking the policy function for a group of consumers and returning multiple messages each one modified for an associated consumer. Messages can also be translated for consumers that request translation. Performing translation or message customization in a policy function allows the modifications to be customized on a per message per consumer basis.

Access to Encrypted Information

Typically, a message broker utilizes state information stored in the message broker and information in the message headers for making decisions on message flow or transformations. Sometimes message attributes can also be included in messages and if the message broker understands the format and semantics of the message attributes the message attributes can also be used to influence the message flow and transformations. However, in general the contents of the message itself is application specific and is not used by a message broker for processing. However, since policy functions can be seen as application specific customization of the message broker, policy functions can be written that do understand the format and semantics of the message body and message attributes and can utilize that message information in the policy decisions made in the customization.

In addition, it is possible for an application to encrypt the message body. In order to utilize information in the message body for policy decisions concerning the message broker behavior it is necessary to decrypt the message body to utilize the information. With user controlled policy functions the application can provide the policy function access to the decryption keys without providing access to the keys to the message broker which is vital if the message broker is provided by a 3rd party from the application.

CONCLUSION

The invention, by teaching the use of user defined and controlled policy functions to programmatically customize the behaviors of a message broker's processing of messages and further allowing for that customization to take place on a per channel basis, provides for greater functionality and flexibility to the users of a message system, especially when the users of the message system don't have administrative control over the message broker.

The user interfaces with the message broker, and the user would utilize a GUI, CLI, and/or an API. It is to be understood that a GUI may not be used in some instances, and any appropriate user interface may be included and used. The user interacts with such a user interface for configuring policy points for a channel they authorized to configure, and/or granting rights to user entities to configure the policy points.

As a non-limiting example, a way the policy function is called would be to place a message in a queue that would then subsequently be processed by a pool of systems that consume that message to process it and return the results. In other words, a policy message is placed on a queue for a system to pull and run, and this process may be considered "calling the policy function".

The user would be able to configure parameters for the invocation of the policy, function, which may or may not be considered "controlling" a trust domain. The user specifies invocation parameters for the execution of the policy function and the same user or a different user may control within which trust domain that policy function executes.

The information the policy function uses is determined by the code and is outside the control of the message broker.

There may be invocation arguments that control the return policy function call, but it may not be the modification of them that controls the return flow. The modification of the arguments controls the continued message processing in the channel after the modified arguments are returned.

To give further context to the disclosure, the disclosure provides for an implementation in a public cloud provider's broker as a service where they would extend their broker service to allow the processing path for a topic or queue to include allowing a user to configure function as a service (FaaS) calls from the topic or queue to assist with the processing of a message. It is to be understood that the policy function may be implemented and/or called by a user without departing from the scope of the disclosure.

The descriptions of the various embodiments of the invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. One or more storage machines holding instructions executable by one or more logic machines to carry out a method of message broker customization of a message broker, the method comprising:
   using at least one logic machine:
   automatically determining receipt of user input through one or more user interfaces by automatically tracking user operation of the user interfaces;
   based on the user input, automatically controlling parameters for calling a policy function to be called at a specific policy point during message processing, wherein the policy function is a user administered function that is external to and executed separate from the message broker and can be inserted into a processing path of a channel for one or messages received by the message broker in order to customize the message processing of the one or more messages;
   based on the user input, automatically deriving an execution environment and trust domain for the execution of the policy function; and
   based on the user input and arguments returned by the policy function controlling continued message processing by the message broker.

2. The method of claim 1, wherein the user input modifies which policy function is to be called at a policy point at will.

3. The method of claim 1, wherein the user input configures the policy point to control which arguments are passed to the policy function.

4. The method of claim 1, wherein the user input specifies different policy functions to be called at different policy points.

5. The method of claim 1, wherein the method further comprises: defining an authorized user to configure the policy point.

6. The method of claim 1, wherein the execution environment for the policy function is on one or more user entity controlled resources.

7. The method of claim 1, wherein the execution environment for the policy function is on third party controlled resources.

8. The method of claim 1, wherein the execution environment for the policy function is made available by a message broker.

9. The method of claim 1, wherein the method further comprises: based on the user input, dynamically initiating and controlling programmatic customization of a message broker's behavior for messaging services.

10. The method of claim 1, wherein the method further comprises: based on the user input, initiating different behavior customization for different services for a first user entity while maintaining message broker services offered to a second user entity.

11. The method of claim 1, wherein the method further comprises: based on the user input, initiating programmatic customization access to sensitive information without exposing the sensitive information to a message broker.

12. The method of claim 1, wherein the user interface is a graphical user interface.

13. The method of claim 1, wherein the user interface is a command line interface.

14. The method of claim 1, wherein the user interface is an application programming interface.

15. One or more storage machines holding instructions executable by one or more logic machines to carry out a method of message broker customization for a message broker, the method comprising:
using at least one logic machine:
automatically determining receipt of a user input through one or more user interfaces by automatically tracking user operation of the user interface;
based on the user input, automatically controlling parameters for calling a policy function to be called at a specific policy point during message processing, wherein the policy function is a user administered function that is external to and executed separate from the message broker and can be inserted into a processing path of a channel for one or messages received by the message broker in order to customize the message processing of the one or more messages;
based on the user input, automatically deriving an execution environment and a trust domain for the execution of the policy function; and
based on the user input and arguments returned by the policy function, controlling continued message processing by the message broker.

16. The method of claim 15, wherein the user input modifies which policy function is to be called at a policy point at will.

17. The method of claim 15, wherein the user input configures the policy point to control which arguments are passed to the policy function.

18. The method of claim 15, wherein the user input specifies different policy functions to be called at different policy points.

19. The method of claim 15, wherein the method further comprises: defining an authorized user to configure the policy point.

20. One or more storage machines holding instructions executable by one or more logic machines to carry out a method of message broker customization, the method comprising:
using at least one logic machine:
automatically determining receipt of user input through one or more user interfaces by automatically tracking user operation of the user interface;
based on, the user input, automatically controlling parameters for calling a policy function to be called at a specific policy point; wherein the policy function is a user administered function that is external to and executed separate from the message broker and can be inserted into a processing path of a channel for one or messages received by a message broker in order to customize the message processing of the one or more messages;
based on the user input, automatically deriving an execution environment and a trust domain for the execution of the policy function;
based on the user input and arguments returned by the policy function, controlling continued message processing by the message broker;
wherein the user input modifies which policy function is to be called at a policy point at will;
wherein the user input configures the policy point to control which arguments are passed to the policy function;
wherein the user input specifies different policy functions to run at different policy points;
wherein the method further comprises: defining an authorized user to configure the policy point;
wherein the information available to the execution environment includes information passed in by the message broker as arguments;
wherein the method further comprises: based on the user input, dynamically initiating and controlling programmatic customization of the message broker's behavior for messaging services; and
wherein the method further comprises: based on the user input, initiating different behavior customization for different services for a first user entity while maintaining message broker services offered to a second user entity.

* * * * *